United States Patent
Wysocki et al.

(10) Patent No.: US 7,999,999 B2
(45) Date of Patent: Aug. 16, 2011

(54) ARTICLE COMPRISING A MULTICHANNEL OPTICAL AMPLIFIED TRANSMISSION SYSTEM WITH FUNCTIONAL UPGRADE CAPABILITIES AND UNIVERSAL MODULES

(75) Inventors: Paul Francis Wysocki, Flemington, NJ (US); Mitchell Steven Wlodawski, West Caldwell, NJ (US)

(73) Assignee: Unopsys, LLC, Flemington, NJ (US)

( * ) Notice: Subject to any disclaimer, the term of this patent is extended or adjusted under 35 U.S.C. 154(b) by 157 days.

(21) Appl. No.: 11/666,826

(22) PCT Filed: Oct. 29, 2005

(86) PCT No.: PCT/US2005/039119
§ 371 (c)(1),
(2), (4) Date: Apr. 30, 2007

(87) PCT Pub. No.: WO2006/050186
PCT Pub. Date: May 11, 2006

(65) Prior Publication Data
US 2008/0068701 A1   Mar. 20, 2008

Related U.S. Application Data

(60) Provisional application No. 60/623,757, filed on Oct. 29, 2004.

(51) Int. Cl.
*H04B 10/17* (2006.01)
*H04B 10/12* (2006.01)
(52) U.S. Cl. .................. 359/337.1; 359/337.4
(58) Field of Classification Search ............... 359/337.1, 359/337.4
See application file for complete search history.

(56) References Cited

U.S. PATENT DOCUMENTS

| | | | | |
|---|---|---|---|---|
| 5,005,175 A * | 4/1991 | Desurvire et al. | ................. | 372/6 |
| 5,726,788 A * | 3/1998 | Fee et al. | ....................... | 398/180 |
| 5,778,132 A * | 7/1998 | Csipkes et al. | ................. | 385/135 |
| 6,263,139 B1 * | 7/2001 | Kawakami et al. | ........... | 385/123 |
| 6,496,619 B2 * | 12/2002 | Naganuma | ....................... | 385/27 |
| 6,894,829 B2 * | 5/2005 | Jolley et al. | ................. | 359/337.4 |
| 6,917,731 B2 * | 7/2005 | Bennett et al. | ................... | 385/15 |
| 2002/0037131 A1 * | 3/2002 | Naganuma | ....................... | 385/27 |
| 2002/0071173 A1 * | 6/2002 | Lee et al. | .................... | 359/337.1 |
| 2002/0105694 A1 | 8/2002 | DeGrange, Jr. et al. | | |
| 2002/0109908 A1 * | 8/2002 | Koteles et al. | ............. | 359/337.1 |
| 2003/0184846 A1 * | 10/2003 | Bennett et al. | ................. | 359/333 |
| 2003/0185483 A1 * | 10/2003 | Bennett et al. | ................... | 385/14 |
| 2003/0185485 A1 * | 10/2003 | Bennett et al. | ................... | 385/14 |
| 2003/0185486 A1 | 10/2003 | Bennett et al. | | |
| 2003/0185518 A1 * | 10/2003 | Bennett et al. | ................... | 385/53 |
| 2003/0223683 A1 * | 12/2003 | Bennett et al. | ................... | 385/24 |
| 2004/0001717 A1 * | 1/2004 | Bennett et al. | ................... | 398/92 |
| 2004/0017602 A1 * | 1/2004 | Bennett et al. | ................... | 359/333 |
| 2004/0028323 A1 * | 2/2004 | Bennett et al. | ................... | 385/24 |
| 2004/0076437 A1 * | 4/2004 | Kaspit et al. | .................... | 398/83 |
| 2005/0105168 A1 | 5/2005 | Ghera et al. | | |

* cited by examiner

*Primary Examiner* — Eric Bolda
(74) *Attorney, Agent, or Firm* — Mayer & Williams PC; Stuart H. Mayer

(57) ABSTRACT

A universal inline functional module for operation with non-zero average gain G≠0dB over a bandwidth is provided. The module includes at least one optical functional element producing loss over the bandwidth and at least one rare-earth doped fiber segment. The module produces a flat gain spectrum to within a specified tolerance when made to operate at an average gain of 0 dB over the bandwidth.

6 Claims, 23 Drawing Sheets

Standard Approach

"Universal" Approach

Fig 10
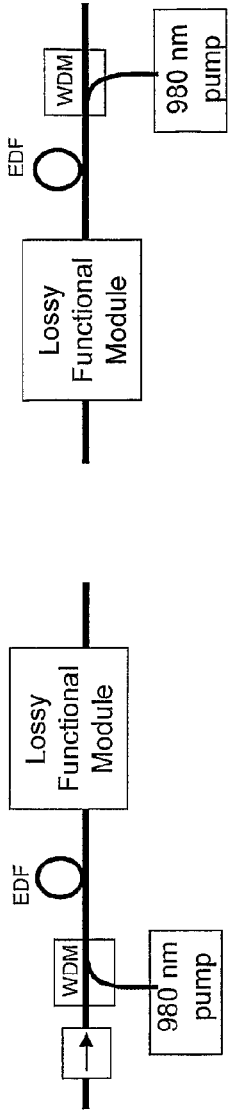
(A) Pumped unfiltered modules
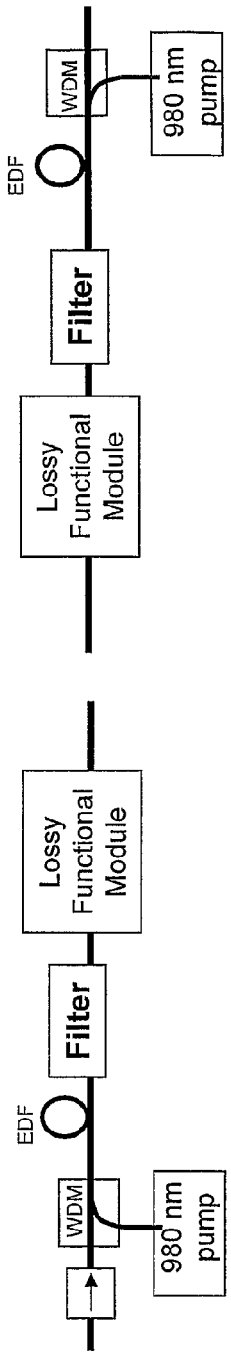
(B) Pumped filtered module
(C) Unpumped unfiltered modules

Fig 10
(D) Unpumped filtered modules
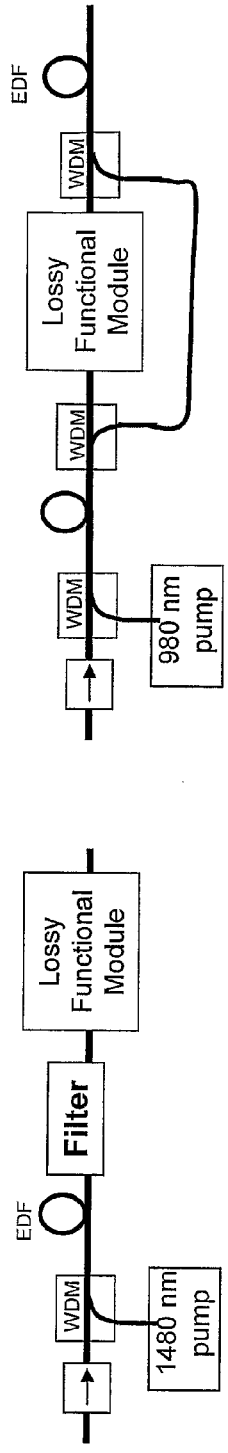
(E) Other variations on modules
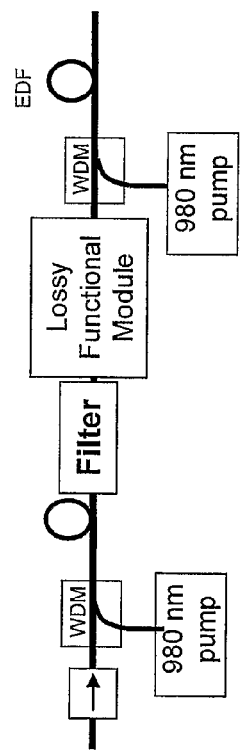

ARTICLE COMPRISING A MULTICHANNEL OPTICAL AMPLIFIED TRANSMISSION SYSTEM WITH FUNCTIONAL UPGRADE CAPABILITIES AND UNIVERSAL MODULES

STATEMENT OF RELATED APPLICATION

This application claims the benefit of U.S. Provisional Patent Application 60/623,757, filed Oct. 29, 2004, entitled "Article Comprising a Multichannel Optical Amplified Transmission System with Functional Upgrade Capabilities and Universal Modules", which is incorporated herein by reference in its entirety.

FIELD OF THE INVENTION

The present invention relates generally to optical fiber communication networks and more particularly to amplification arrangements in optical fiber networks which are modular and upgradeable, thereby reducing the complexity and cost associated with the use of multiple unique optical modules.

BACKGROUND OF THE INVENTION

In current optical communication systems, signals are transmitted long distance using multiple wavelengths of light passing through optical fibers. Each optical carrier wavelength can be encoded with a unique set of information. The broader the optical bandwidth of the transmission system, the more information can be transmitted using more wavelength-division multiplexed (WDM) signals. Such WDM optical systems use optical fibers, which produce some level of optical loss, typically 0.15-0.3 dB/km. Additionally, components used in these systems to perform functions such as dispersion compensation or dynamic equalization add optical loss. In order to overcome these losses and maintain the optical signal to noise ratio (OSNR) of each channel, optical amplification is required periodically. Such optical amplification must be broadband, at least as broadband as the wavelength range of signals to be transmitted and its gain must be close to constant for all signal wavelengths (gain flat) so that all signals experience nearly the same gain. Additionally, the amplification must not add much noise to the amplified signal, as represented by a low amplifier noise figure (NF).

Unfortunately, the gain of most optical gain media is not flat across a wide range of optical wavelengths. However, flatness can be achieved using an optical filter, which is a device that creates a predetermined wavelength-dependent optical loss to perfectly compensate for any gain flatness error. Such a filter is typically placed within each amplifier to achieve gain flatness to some tolerance level. For most optical gain media, such a filter makes the gain flat at only one particular gain magnitude. So, a different filter is needed if the optical gain or output power level of the amplifier changes.

While optical gain is possible in many different gain media, in most current deployed optically amplified communication systems, the gain medium consists of erbium ions doped into a silica-based fiber. Such erbium-doped fiber amplifiers (EDFAs), when provided with sufficient optical pump radiation from available pump diodes, can provide efficient low noise amplification at the low loss window of optical transmission fibers, namely near 1550 nm. EDFAs can produce gain across a 40 nm window from 1525-1565 nm (called the C-band) or can be designed differently to produce gain from 1565-1605 nm (called the L-band). In both bands, the gain is not adequately flat for most WDM optical communications systems without the inclusion of some filtering, and the shape of the gain varies with operating condition.

In most cases, optical systems contain a wide range of optical span lengths with a range of component losses, leading to an even wider range of optical losses. These must be compensated by EDFAs that achieve gain flatness for a wide dynamic range of optical gain levels. Such variation can be accommodated in several ways. The most direct way is to design a different custom amplifier, typically an EDFA, that is gain flat, produces a low NF and adequate output power for each prescribed operating gain point. Such an approach meets performance needs, but is expensive and requires a large inventory of EDFAs designed to different specification (often called design codes). A second approach is to add loss to every span to make all span losses equal and to emulate the maximum component loss ever present in a worst case span, hence requiring all amplifiers to be the same. Such an approach unnecessarily and often severely degrades the NF and/or power output of the EDFAs and the OSNR at the end of the system.

The third and prevailing approach to accommodate gain variation in optical amplifiers is to add a variable loss element, typically called a variable optical attenuator (VOA) within each amplifier at a location where it does not unnecessarily penalize the NF or power output. Such VOAs are commercially available and have been made using a variety of optical technology platforms. Using a VOA within an EDFA, the operating gain can be adjusted by changing both the pump power used and the loss setting of the VOA so that a low NF and gain flatness can be maintained for a range of gain levels and output powers. The range of gain levels (the dynamic range) that can be accommodated while still maintaining adequate performance (including a low NF, gain flatness, and required output power) by using such a VOA approach is typically less than 15 dB. Additionally, some of this dynamic range is often used to adjust for changes as the system ages, so that the useful dynamic range to adjust for link variations is typically less than 10 dB.

The usable dynamic range of an EDFA is often further reduced in order to accommodate a range of lossy component modules, known as dispersion compensation modules (DCMs). The loss of such modules, and the need for their use, depends on the bit rate of the system, the length of the span fibers and the type of transmission fiber used. Depending on the system design, as little as 3 dB of amplifier dynamic range might be available to accommodate span length variation, even when a VOA is included in each amplifier. This usually means that, even with a VOA in each EDFA, several EDFA codes are required to adjust for all possible system link scenarios.

Even further, systems designed to make different length links and to accommodate different types of traffic require even more EDFA codes. For example, most optical system vendors support different designs for long-haul (LH) systems that convey information up to 1000 km in point-to-point links, metro systems that send information around a ring like architecture of a few hundred km lengths and ultra-long-haul (ULH) systems that send information across transcontinental distances.

The proliferation of EDFA designs and unique incompatible optical modules is a great expense and reduces flexibility to accommodate future needs without large-scale redesigns. Accordingly, it would be desirable to design an optical system that does not require a large number of EDFA codes or unique optical modules.

BRIEF DESCRIPTION OF THE DRAWINGS

FIGS. 10A-10E: Exemplary configurations of components in universal modules with and without filters, with and without pumps.

SUMMARY OF THE INVENTION

Figure 1:
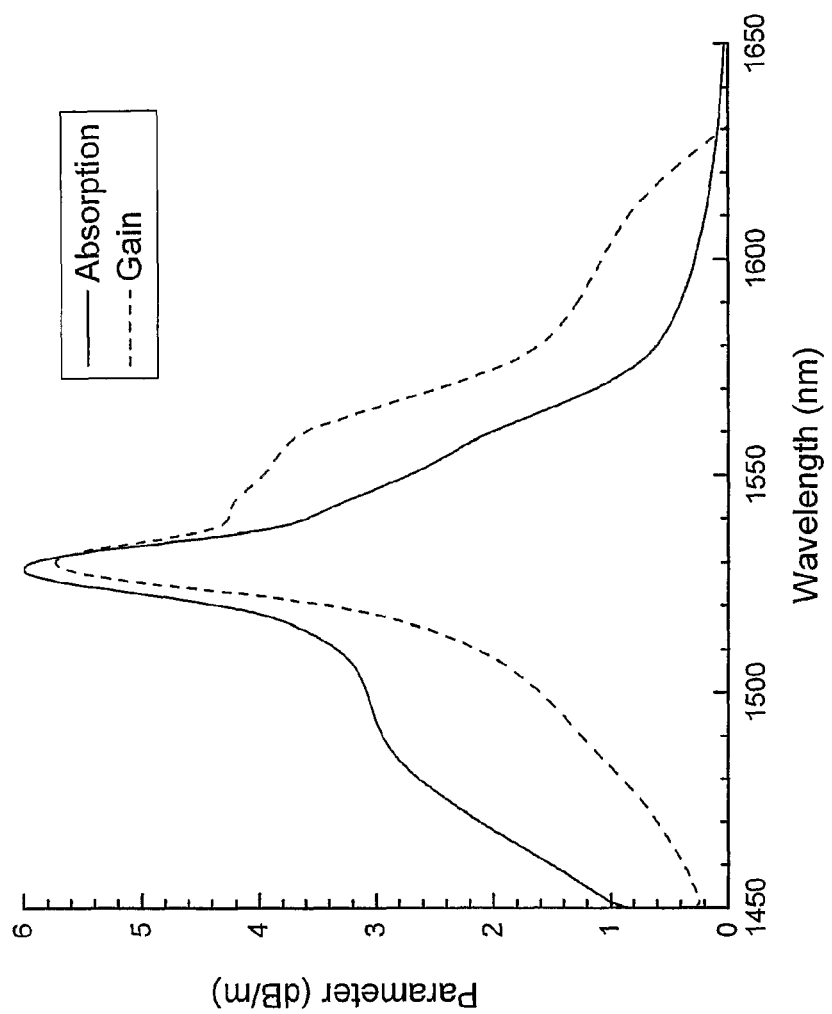
FIG. 1: Base modeling parameters for a typical EDF. This particular example is a high aluminum co-doped silicate.

The present invention provides an alternative way to design an optically amplified system that requires fewer unique modules and amplifiers and a system designed by such an approach. By removing the customization from the EDFAs and moving it to already custom functional modules, the invention allows the number of unique modules to be reduced and the creation of a universal plug and play optical network.

The present invention is embodied in a multichannel optical fiber communication network with EDFAs in which functional inline optical modules are modified by the inclusion of passive or active optical components in order to be rendered interchangeable from a gain spectrum, noise and power perspective. In this context, "functional inline optical modules" refer to any type of optical modules, other than EDFAs, through which optical signals pass on their way from transmitter to receiver and which perform an optical function such as, but not limited to, optical dispersion compensation, polarization control, channel adding and dropping, dynamic gain equalization and variable optical attenuation. These devices are distinguished from optical devices that are not inline by the fact that signals pass directly through these devices between transmitter and receiver. Examples of devices or modules that would not be classified as inline include optical power monitors and optical channel monitors, which sample a small portion of the signals so that the sampled portion does not pass through the device.

When a functional inline optical module is modified in the manner noted above a universal functional inline optical module is formed that reduces the customization required in the EDFAs employed in optical fiber communication networks. Each such module does not require an adjustment to the EDFA in order to accommodate its loss in the system. Hence, the EDFA is greatly simplified and may avoid the need for an internal variable optical attenuator to perform its function. Furthermore, such universal modules can be plug-and-play interchangeable and can be cascaded to create a wide range of functionality. The universal modular devices described herein are modified to include some length of EDF, which is determined by the loss of the functional module. The universal modular devices may also include a low magnitude filter to improve performance. The EDF may be pumped optically to produce gain, or remain unpumped to produce loss.

According to one aspect of the invention, the optical system designed using the described method will include, in the signal path between transmitter and receiver, only transmission fiber, EDFAs and modified universal inline modules. According to another aspect, not every inline module need be modified, but the majority of units are modified in such a way so that significant advantages of the approach can be realized. According to yet another aspect, only two or more of the inline modules are modified, which still allows significant advantages of the present invention to realized.

According to yet another aspect of the invention, the EDFA design used in such a modular system design is relatively simple and does not require an internal variable optical attenuator to provide adjustment, but which nevertheless is able to accommodate a wide range of span losses and functional modules.

According to another aspect of the invention, the amplifier is an EDFA operating in the C-band or L-band.

DETAILED DESCRIPTION

In early optically amplified communication systems, erbium-doped fiber amplifiers (EDFA) were used to amplify single channels at a particular optical wavelength in the C-band. It soon became apparent that the gain bandwidth of such EDFAs allowed them to be used to amplify multiple signals simultaneously. This approach is known as wavelength-division multiplexing (WDM) and it is a standard approach in optical transmission systems for most applications, for many system lengths, span lengths and bit rates. The gain spectrum of an EDFA depends on operating condition. In the first approximation, the spectrum can be mathematically computed using the following formula:

$$G(\lambda, \overline{Inv}, l) = [(g^*(\lambda) + \alpha(\lambda))\overline{Inv} - \alpha(\lambda) - BG(\lambda)]l - L(\lambda) \quad (1)$$

where $g^*(\lambda)$ and $\alpha(\lambda)$ are respectively the fully-inverted gain and the uninverted absorption coefficients of the erbium ions in the EDF per unit length, $\overline{Inv}$ is the average ion inversion along the fiber length l, $BG(\lambda)$ is the background loss of the EDF per unit length and $L(\lambda)$ is the sum of all the passive optical loses of all components and all attachment methods used in the EDFA. This includes any fixed or dynamic filters and VOAs located within the EDFA structure.

Equation 1 is generally applicable to any EDFA, no matter how many stages it has and how complex it is, as long as the length used is the total length of all EDF in the EDFA, the average inversion value used is the average across all segments of EDF, the component loss $L(\lambda)$ is the sum for all passive components in the signal path and the fiber parameters $BG(\lambda)$, $g^*(\lambda)$ and $\alpha(\lambda)$ are the same for all EDF segments (the same EDF is used in all segments). The base parameters $g^*(\lambda)$ and $\alpha(\lambda)$ for a typical EDF are shown in FIG. 1. This fiber is a high-aluminum silicate fiber, a composition typically used to produce a flat gain spectrum. $BG(\lambda)$ is typically a low magnitude and nearly wavelength independent quantity that will be neglected here for ease of discussion.

Figure 2:
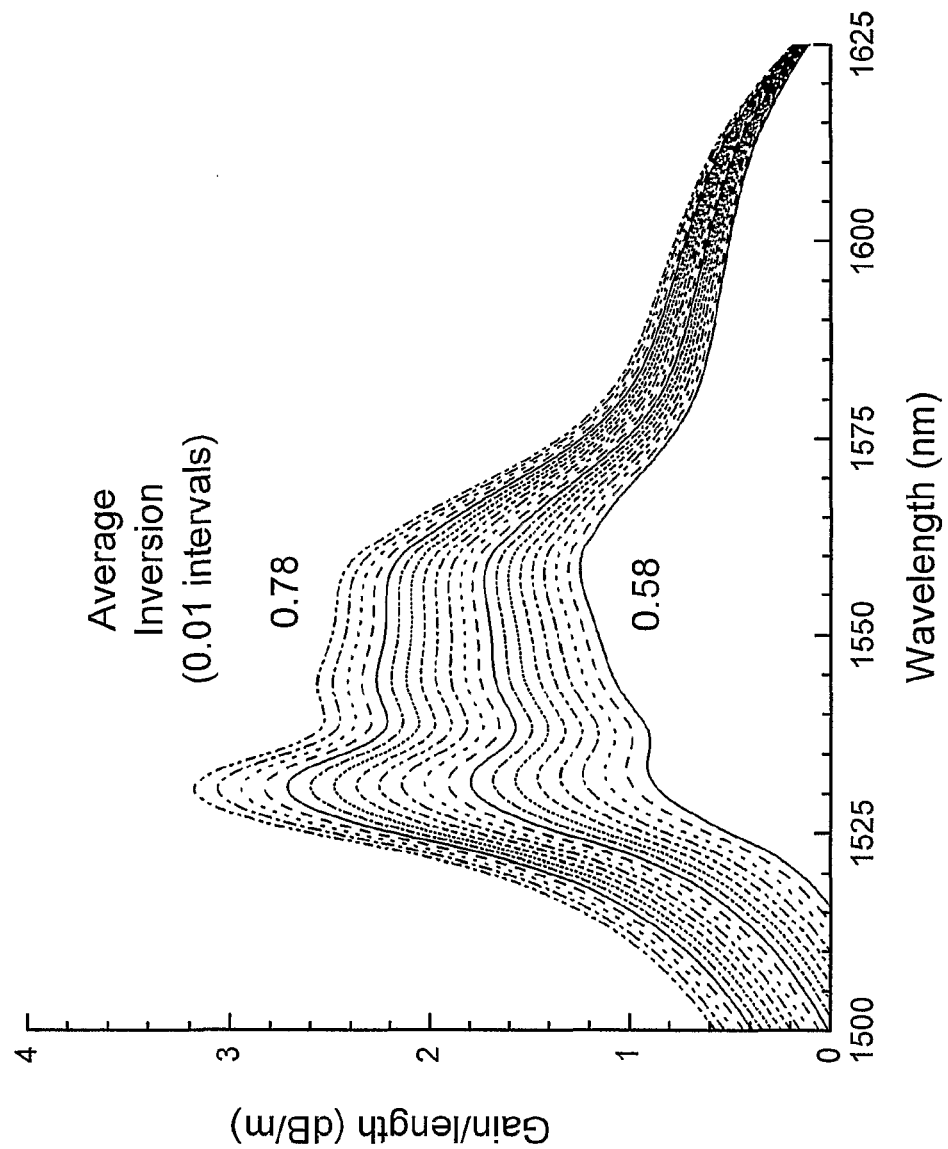
FIG. 2: Gain per unit length as a function of average erbium ion inversion for the fiber with modeling parameters shown in FIG. 1 operating in a regime typical for a C-band EDFA.
Figure 3:
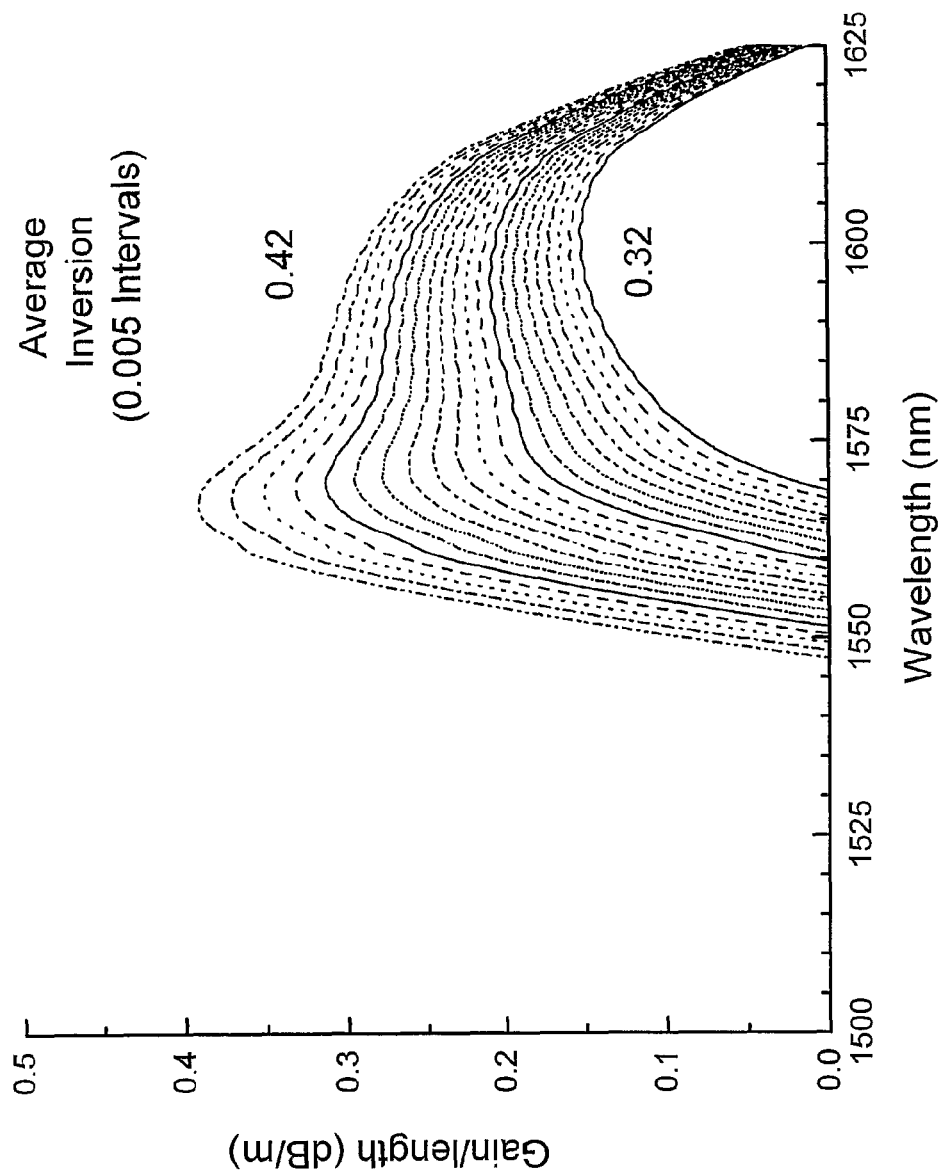
FIG. 3: Gain per unit length as a function of average erbium ion inversion for the fiber with modeling parameters shown in FIG. 1 operating in a regime typical for a L-band EDFA.

Eq. 1 can be rewritten (neglecting background loss) in a more illustrative form:

$$[G(\lambda, \overline{Inv}, l) + L(\lambda)]/l = (g^*(\lambda) + \alpha(\lambda))\overline{Inv} - \alpha(\lambda) \quad (2)$$

where the left side of the equation represents the EDF gain per length needed to achieve the measured gain $G(\lambda, \overline{Inv}, l)$ with the known component losses $L(\lambda)$. The average inversion of the erbium ions and the effective gain per unit length of the EDFA are linearly related. For the fiber represented by FIG. 1, a plot of the left side of this expression vs. average inversion is shown in FIG. 2 for average inversion levels from 0.58 to 0.78, typically useful values for EDFA operation in the C-band. Similarly, a plot for average inversion levels ranging from 0.32 to 0.42, typical values for EDFA operation in the L-band, is shown in FIG. 3. For the C-band, operation near 0.66 average inversion produces the flattest spectrum, while, for the L-band, 0.375 average inversion produces the best flatness. Any EDFA at any gain level can achieve any of these spectra, by simply choosing the length such that FIG. 2 or 3, when multiplied by the length, produces the desired gain.

The above mathematics shows a truth about optical amplification in EDFAs not fully understood by many who work with these devices, namely, that if a given EDFA achieves a given gain and contains a known amount of component losses and EDF length, the spectrum is always the same. This statement is an excellent approximation, though not perfect for most EDFAs. The gain spectrum shape is a direct indicator of the average ion inversion, no matter how pump power is provided (from what direction or a what pump wavelength), how much pump energy is needed to achieve the gain or how the component losses or fiber length are rearranged. This law holds in the approximation that all erbium ions are optically identical, a condition that is called homogeneous broadening. The approximation is a good one and is generally accepted for EDFs, with only minor corrections made for spectrum inhomogeneity.

Optical communications systems are often designed with a wide range of span losses between optical regeneration sites (amplifiers) and also use a range of different transmission fiber types with different losses and different characteristics. Practical issues do not often allow the amplifiers to be evenly spaced or the system to operate with only a single fiber type. One characteristic of an optical fiber is its optical chromatic dispersion, which is a measure of the difference in propagation speeds of light in the fibers as a function of wavelength. Systems are often designed containing devices that compensate for dispersion, so that all wavelengths contained in a signal arrive at the receiver at the same time. These dispersion-compensating modules (DCMs) create optical loss and are often added within the system inside the optical amplifier or between stages of amplification, a design decision that is known to advantageously minimize the accumulation of optical noise.

Figure 4:
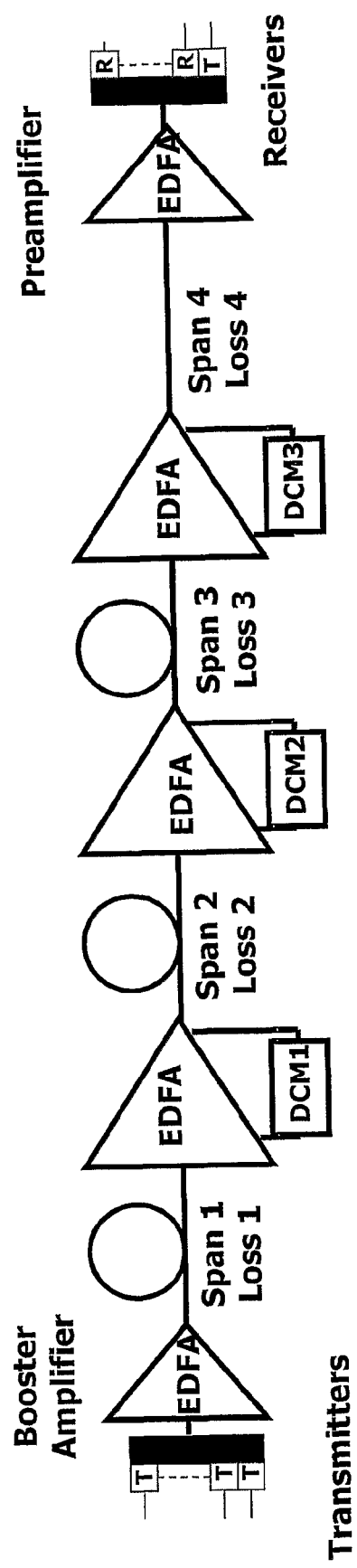
FIG. 4: Exemplary point-to-point optical transmission system using EDFAs.
Figure 5:
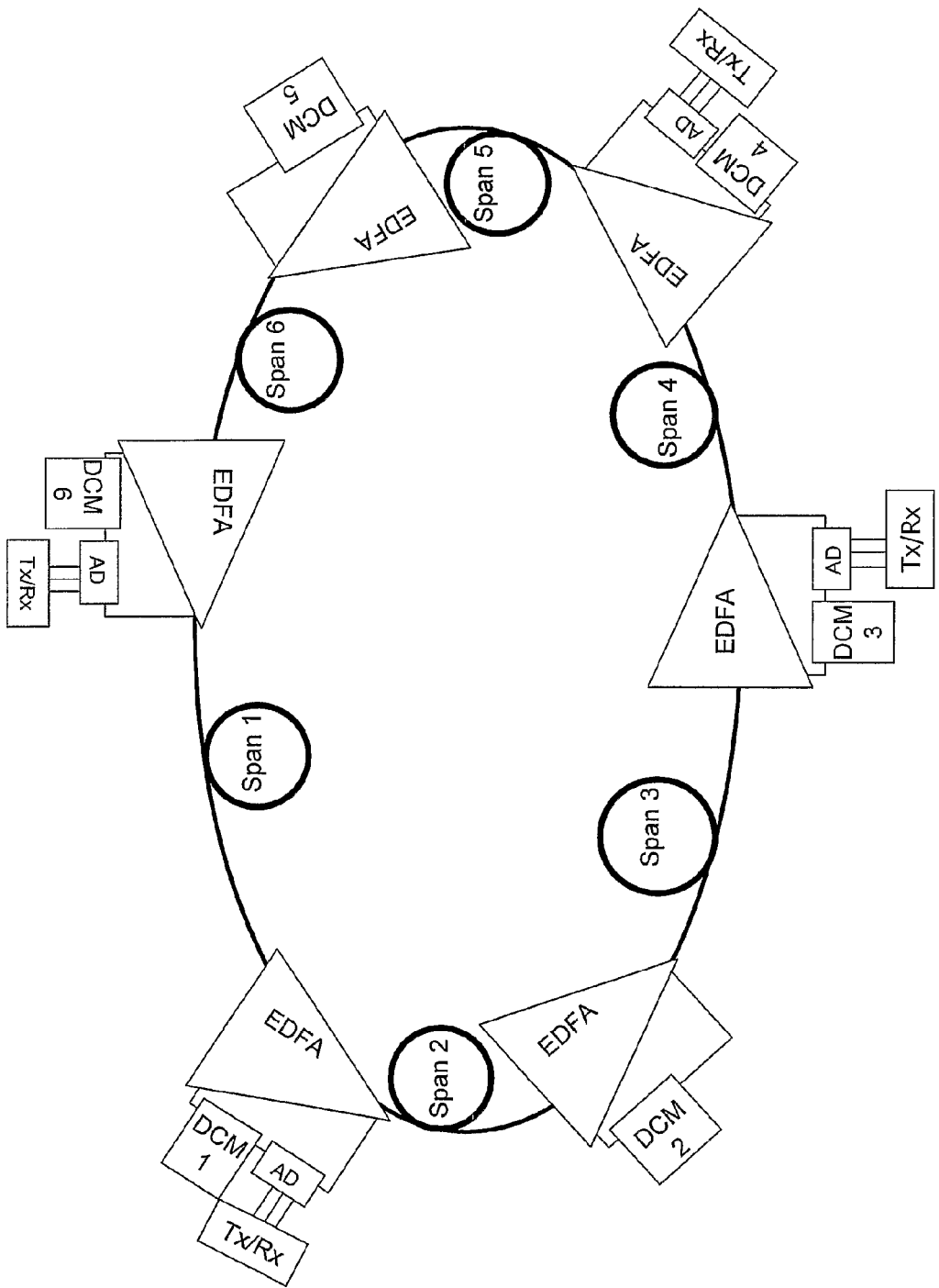
FIG. 5: Exemplary ring optical transmission system using EDFAs.

An exemplary point-to-point transmission system using EDFAs is illustrated in FIG. 4. In this case, many signals are combined and transmitted through a series of EDFAs and transmission span fibers to a common end location where they are separated and sent to receivers. Similarly, an exemplary ring type optical transmission system is shown in FIG. 5. In this configuration, signals at different wavelengths are added to the ring and dropped from the ring at several locations (called nodes). The net result is a variety of total path lengths and fiber types experienced by different signals. In both types of systems, different types of transmission fibers may be used. Typical varieties include SMF-28, a standard single-mode optical fiber made by Corning Inc, and True-Wave fiber, another fiber made by OFS-Fitel. The distance between amplifiers and hence the fiber loss may vary from span to span, as may the dispersion present. So each span may require a different DCM type to perfectly compensate for the dispersion present. In order to reduce the number of EDFA custom design codes, it is advantageous for an EDFA to produce a range of optical gain levels, a wide dynamic range, while still maintaining low NF characteristics and a high output power. Such an EDFA is expensive and difficult to control.

For the purpose of this disclosure we define an optical communication link as a series of optical components connected in series and making a connection between an optical transmitter and an optical receiver. The link often consists of a series of spans, that is, lengths of transmission fiber and possibly other passive components separating points of optical or electrical signal regeneration. Such points of signal generation are required because signals experience optical loss in the span fibers and eventually the signal to noise ratio of the signal is inadequate to receive error free transmission. Typically in such networks, spans are 20 km, 40 km, 80 km, 100 km or 120 km in length. For the purpose of this disclosure the points of optical regeneration are one type of network node. A node is defined here as a localized point in a network containing optical signal conditioning elements such as amplifiers add/drop modules or passive optical components and being connected to at least 2 span fibers. A node is characterized by a set of optical equipment or components all located within close proximity, often within one small building. For the sake of clarity, this patent restricts the term node to refer to localized area no more than 1 km in extent.

Figure 6:
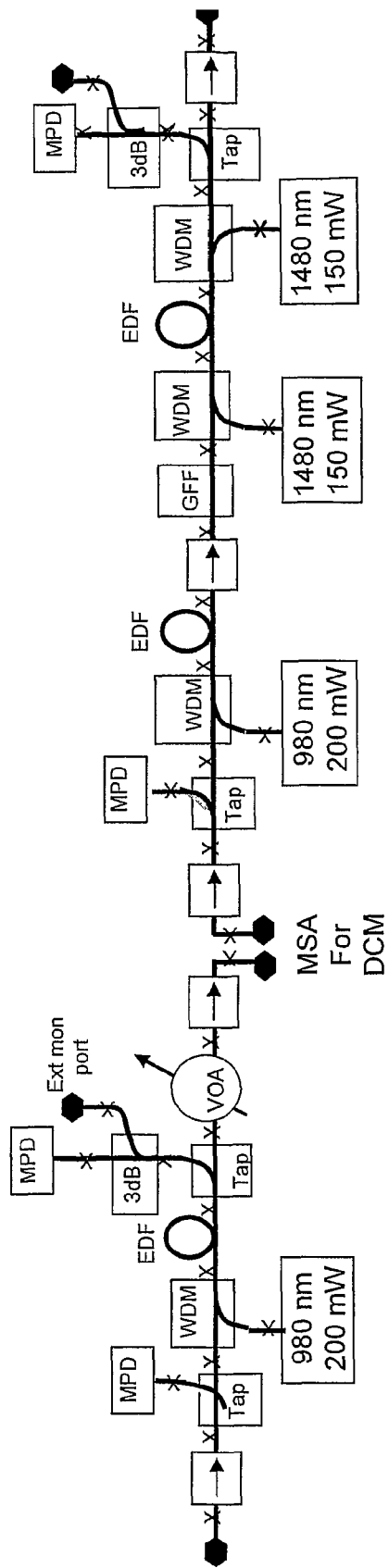
FIG. 6: Exemplary 3-stage EDFA according to standard practice using a VOA to adjust the operating flat gain range. This design is most typical of long-haul and ultra-long-haul links.
Figure 7:
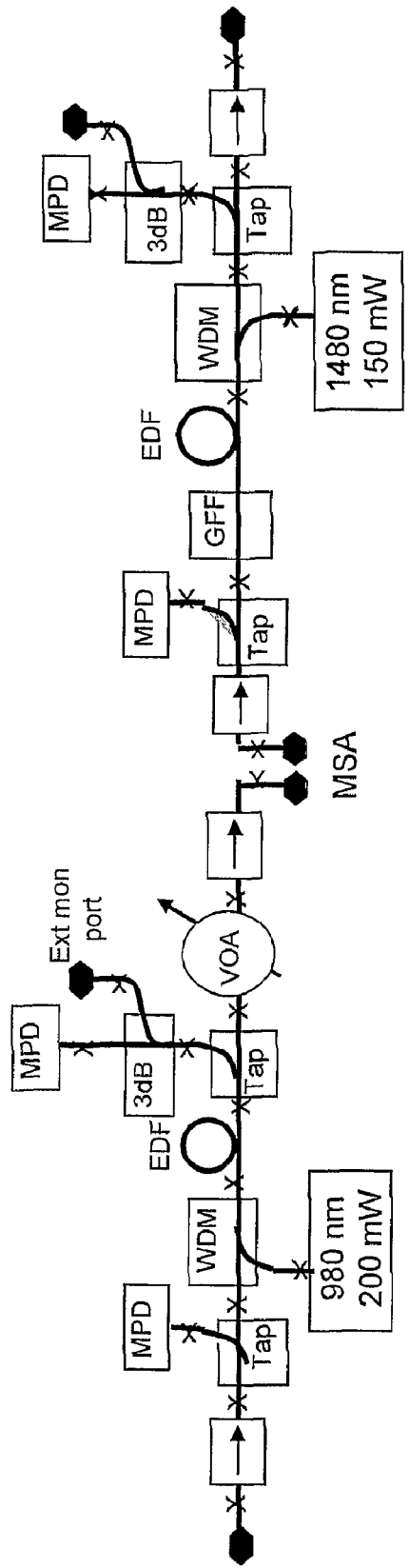
FIG. 7: Exemplary 2-stage EDFA according to standard practice using a VOA to adjust the operating flat gain range. This design is most typical of core-metro links.

Currently, a wide dynamic range is achieved in an EDFA by inserting a VOA within the amplifier and varying the passive loss of the VOA to accommodate variations in span and other component losses. An exemplary wide-dynamic range EDFA that accommodates a DCM at a midstage access point (MSA) according to the currently favored approach is shown in FIG. 6. Similarly, using the current approach, an exemplary simpler wide-dynamic range EDFA with an MSA is shown in FIG. 7. The EDFA of FIG. 6 is typical of long-haul applications while the FIG. 7 design is more typical for metro systems. In these diagrams, optical taps are shown and are used to send light to monitor photodiodes to actively monitor EDFA performance. Optical isolators (indicated by boxes with arrows) are used to eliminate backward traveling reflected signals and backward-traveling amplified spontaneous emission (ASE), while WDMs are used to couple pump light into each stage while passing signal through the chain of amplifiers.

It is a poorly understood fact that, in an amplified system, each module, whether a functional module or EDFA need not be independently gain flattened. Instead, there is only a primary requirement that all signals experience the same gain or loss between the transmitter and receiver. In reality, this requirement is more correctly a requirement for equal optical signal to noise ratio (OSNR), which usually occurs when the OSNR for the worst channel is maximized. However, the flat gain condition and the equal OSNR are reached at very similar conditions and are used interchangeably here. So, in an N span link, where a span includes all devices from the output of an EDFA to the output of the next EDFA, the flat link gain can be written:

$$G_{link}(\lambda) = \sum_{i=1}^{N} G_{span}(\lambda) = G_{link} \quad (3)$$

In this equation, it is assumed that the final span could have no EDFA, a very different transmission fiber length, and a much lower signal output power to the receiver, without loss of generality. For flatness, the link gain is independent of wavelength.

Within a span in the most general sense there can be any of the following:
1) EDFA
2) span transmission fiber
3) DCM
4) Other functional inline optical modules Within the EDFA, there are or may be any of the following:
1) EDF
2) Passive components
3) Pump diodes
4) VOAs
5) midstage access ports (MSA)

For the purpose of this treatment, functional inline optical modules (FIOM) are any modules that serve an optical function other than amplification and through which the signal passes between transmitter and receiver. For the purpose of this treatment, FIOMs include, but are not limited to the following:
1) DCMs
2) Add/drop modules
3) polarization controllers
4) tunable DCMs
5) Dynamic gain equalization filters (DGEFs)
6) VOAs
7) Dynamic tilt controllers Eq. 3 implies that each span need not be gain flattened as long as the overall gain is flat. This is not exactly true in practice. In particular, if the input channel power levels to each span are not flat, nonlinear optical effects such as four-wave mixing (FWM) begin to hurt performance. Even without FWM, unequal channels eventually leads to significant NF degradation for weak channels. So, in reality, the goal for most systems is to guarantee that the gain of each span is flat or nearly flat. Furthermore, the power launched into each successive span is normally kept constant in order to minimize the accumulation of noise. Under these conditions, gain flatness is required for each span, but not individually for all the modules within the span.

Eq. 1 can be rewritten to reflect the presence of a VOA, the optical transmission span and any number M of FIOMs. In particular, treating the entire span, from the beginning of an EDFA to the end of the following transmission fiber length as a single entity, we may write for span i:

$$G_{span,i}(\lambda, \overline{Inv}, l) = [(g*(\lambda) + \alpha(\lambda))\overline{Inv} - \alpha(\lambda)]l - L_{pass,e} - \quad (4)$$
$$L_{filt,e1}(\lambda) - L_{VOA,e} - \sum_{j=1}^{M} L_{mod,j}(\lambda) - L_{span,i}(\lambda) \approx 0$$

where $L_{pass,e}, L_{filt,e}(\lambda), L_{VOA,e}, L_{mod,j}(\lambda)$ and $L_{span,i}(\lambda)$ are the wavelength independent losses of all passive components in the EDFA (not including VOA and filter), the loss of any filtering element in the EDFA (wavelength dependent), the adjustable loss of a VOA in the EDFA, the loss of each FIOM number j and the loss of the span transmission fiber respectively. In the typical system design each EDFA (including all components within the EDFA device module) produces about enough gain to overcome the preceding span loss, so that Eq. 4 evaluates to about 0 for each span.

Eq. 4 is written in an unnecessarily restrictive way in order to illustrate a key concept of the invention. The FIOMs included are assumed to create only loss $L_{mod,j}(\lambda)$, and not any amplification. Such functional modules contain only the functional device. This is the standard approach to system design but is highly and unnecessarily restrictive. In this invention, the FIOMs are assumed to include passive losses without wavelength dependence, EDF of length $l_{mod,j}$ and filters. Then, the span gain can be rewritten:

$$G_{span,i}(\lambda, \overline{Inv}_e, l_e, \overline{Inv}_j, l_{mod,j}) = [(g*(\lambda) + \alpha(\lambda))\overline{Inv}_e - \alpha(\lambda)]l_e - \quad (5)$$
$$L_{pass,e} - L_{filt,e2}(\lambda) - L_{VOA,e} - L_{span,i}(\lambda) +$$
$$\sum_{j=1}^{M} [[(g*(\lambda) + \alpha(\lambda))\overline{Inv}_j - \alpha(\lambda)]l_{mod,j} - L_{mod,j} - L_{filt,j}(\lambda)] \approx 0$$

Eq. 5 has more degrees of freedom than required to meet the conditions for flatness for all spans and functional modules. The desire is to use the degrees of freedom in the modules to remove the VOA from the EDFA and to accommodate a range of spans while still maintaining 0 gain and flatness. Assuming no VOA and a wavelength independent span loss, Eq 5 is rewritten:

$$G_{span,i}(\lambda, \overline{Inv}_e, l_e, \overline{Inv}_j, l_{mod,j}) = [(g*(\lambda) + \alpha(\lambda))\overline{Inv}_e - \alpha(\lambda)]l_e - \quad (6)$$
$$L_{pass,e} - L_{filt,e2}(\lambda) - L_{span,i} +$$
$$\sum_{j=1}^{M} [[(g*(\lambda) + \alpha(\lambda))\overline{Inv}_j - \alpha(\lambda)]l_{mod,j} - L_{mod,j} - L_{filt,j}(\lambda)] \approx 0$$

But, this equation can be further simplified by realizing that it doesn't matter where the EDF is located, as long as the total length and average erbium inversion are chosen to produce the correct gain spectrum. So, we may write:

$$G_{span,i}(\lambda, \overline{Inv}_{tot}, l_{tot}) = [(g*(\lambda) + \alpha(\lambda))\overline{Inv}_{tot} - \alpha(\lambda)]l_{tot} - \quad (7)$$
$$L_{pass,e} - L_{filt,e2}(\lambda) - L_{span,i} - \sum_{j=1}^{M}[L_{mod,j} + L_{filt,j}(\lambda)] \approx 0$$

where:

$$l_{tot} = l_e + \sum_{j=1}^{M} l_{mod,j} \quad (8a)$$

and:

$$\overline{Inv}_{tot} = \frac{\overline{Inv}_e l_e + \sum_{j=1}^{M} \overline{Inv}_j l_{mod,j}}{l_{tot}} \quad (8b)$$

Eq. 4 and Eq. 7 represent the same condition except that Eq. 4 maintains flatness using a VOA while Eq. 7 maintains flatness by the inclusion of EDF and filters in functional modules. So, equating these 2 equations and eliminating terms:

$$[(g*(\lambda) + \alpha(\lambda))\overline{Inv}_{tot} - \alpha(\lambda)]l_{tot} - [(g*(\lambda) + \alpha(\lambda))\overline{Inv} - \alpha(\lambda)]l - \quad (9)$$
$$L_{filt,e2}(\lambda) + L_{filt,e1}(\lambda) - \sum_{j=1}^{M} L_{filt,j}(\lambda) + L_{VOA,e} = 0$$

One solution of Eq. 9 is clearly to set $l_{tot}=l$, $\overline{Inv}_{tot}=\overline{Inv}$ and $L_{filt,e2}(\lambda)=L_{filt,e1}(\lambda)$. Then the loss of the filters in the modules must just equal the loss of the VOA setting when the module is present. In an even more degenerate case, when no EDF is placed in the modules, this just amounts to building out the loss of all modules to equal the maximum loss the EDFA can accommodate. For example, if an EDFA is designed to accommodate 10 dB of loss at an MSA, then, when 2 modules are placed at the MSA with 2 and 3 dB of loss respectively, the VOA would be set to 5 dB to make up for the lower loss present. On the other hand, 5 dB of total loss could be added to the 2 modules and the VOA removed. This solution is of little value because it does not reduce complexity or cost for the EDFA and modules.

A better way to utilize Eq 9 is to require the EDFA used to be the simplest EDFA design required when the span is the simplest type of span possible in the network. Then it is possible to move the complex components required by a worse-case condition into the functional modules required under that condition. It is also advantageous to require every FIOM of a given function to be interchangeable in this equation and to be able to use a single EDFA for a wide range of spans. As an example of how to do this, we might design the base EDFA to operate for minimum span loss and module loss that might be present. As a comparison, Eq. 4 implied the approach to design the EDFA for the worst case condition and to add VOA loss whenever needed. So, in Eq 4, if we assume the desire to operate at an optimum ion inversion (a flat point shown in FIG. 2 or 3 for example) then the fiber length would be determined by achieving this inversion for the longest span and the highest MSA losses with the VOA set to 0 dB of loss. This standard approach would yield:

$$l(\lambda) = \frac{L_{span,max} + L_{pass,e} + L_{filt,e1}(\lambda) + \sum_{j=1}^{M} L_{mod,max}(\lambda)}{[(g*(\lambda) + \alpha(\lambda))\overline{Inv}_{opt} - \alpha(\lambda)]} \quad (10a)$$

$$l = \text{maximum}[l(\lambda)] \quad (10b)$$

If the filter is designed to produce flatness then the length choice becomes constant as a function of wavelength.

On the other hand, if the EDFA is designed for the minimum span loss and minimum module loss that might be present in a span using Eq. 7, and the module filters are assumed to be designed to produce 0 loss at the lowest gain wavelength, then the EDF length in the EDFA alone becomes:

$$l_e(\lambda) = \frac{L_{span,mn} + L_{pass,e} + L_{filt,e2}(\lambda) + \sum_{j=1}^{M}[L_{filt,j,mn}(\lambda) + L_{mod,mn}(\lambda)]}{[(g*(\lambda) + \alpha(\lambda))\overline{Inv}_{opt} - \alpha(\lambda)]} \quad (11a)$$

$$l_e = \text{maximum}[l_e(\lambda)] \quad (11b)$$

By the new approach presented here, the EDF length in the EDFA is shorter and no VOA is present. Then, assuming the EDF and filters in the modules will maintain flatness when each module is present, it is possible to determine filters and EDF lengths in the modules that will satisfy Eq. 7. In the case of modules with higher loss and a span with more loss than the minimum we can solve the equations. If we assume all the modules will also operate at the optimum inversion we can show that:

$$[(g*(\lambda) + \alpha(\lambda))\overline{Inv}_{opt} - \alpha(\lambda)]\left[\sum_{j=1}^{M} l_{mod,j}\right] + \quad (12)$$
$$L_{span,min} - L_{span,i} - \sum_{j=1}^{M}[L_{filt,j}(\lambda)] +$$
$$\sum_{j=1}^{M}[L_{filt,j,min}(\lambda)] - \sum_{j=1}^{M}[L_{mod,j}] + \sum_{j=1}^{M}[L_{mod,min}] = 0$$

Eq. 12 shows one way that the length of the EDF in the modules can be chosen such that Eq. 7 will hold. Eq. 12 was generated using the somewhat restrictive condition that the EDFA and modules all operate under the same inversion condition. It is noted that the filter shape in the modules appears in Eq 12 in a somewhat artificial way. It is most logical to assume that the minimum modules (with the minimum module loss) will contain no filter, or rather, that their filters will be combined with the filter in the EDFA. Hence, the filter shapes in the modules with a higher loss are just present to compensate for the ripple implied by the EDF in that module, if the module EDF were to be operated at the optimum average inversion. However, it is noted that the modules need not operate at this point (they need not be independently flattened) to achieve overall flatness. As long as the span gain is as desired, the combination of modules designed as described and EDFAs described as above will be flat.

Assuming that the span loss is fixed, each module can be designed to have an EDF fiber length to make up for the difference between its loss and the minimum module loss:

$$l_{mod,j}(\lambda) = \frac{L_{mod,j}(\lambda) - L_{mod,min}(\lambda) + L_{filt,j}(\lambda)}{[(g*(\lambda) + \alpha(\lambda))\overline{Inv}_{opt} - \alpha(\lambda)]} \quad (13a)$$

$$l_{mod,j} = \text{maximum}[l_{mod,j}(\lambda)] \quad (13b)$$

Then, the module filters just compensate for the ripple of the modules.

It turns out that modules designed using Eq 13a are far more powerful than implied by the assumptions made in the derivation. By using an EDFA and modules designed using Eq 11 and 13 it is possible to show that Eq 7 will hold regardless of the operating inversion of each individual module as long as the average erbium inversion of all modules fits the relationship:

$$\overline{Inv}_{tot} = \frac{\overline{Inv}_e l_e + \sum_{j=1}^{M} \overline{Inv}_j l_{mod,j}}{l_{tot}} = \overline{Inv}_{opt} \quad (14)$$

So, if several modules are cascaded at the MSA of an EDFA that is flat without any functional modules present, the combination will produce gain flatness as long as the EDFA pump power is adjusted to guarantee that the output power of the EDFA (end of span) is as designed. One way to look at this is that the EDFA is designed to account for the gain ripple associated with producing the minimum gain condition. The modules are designed to account for the ripple that is produced when an EDFA is added to the module and the entire module is operated with 0 gain. However, the module need not operate with 0 gain and the EDFA need not operate with the minimum design gain. As long as the overall gain of the cascade is the sum of the design gains, the overall spectrum will be flat.

A look at the approach described above shows that the design of Eq. 13 did not account for span loss differences shown in Eq. 12 since span loss differences are not associated with a given module. One way to do this is to include a VOA, which now has much more dynamic range to adjust for span loss changes than when the modules are not modified as above. However, in order to eliminate the need for the VOA, it is possible to absorb the span loss difference into one of the modules. For example, DCMs are normally customized for a particular span length and transmission fiber type. Hence, the EDF length in the DCMs can be set to accommodate both the DCM and the span loss difference. Using Eq 12 this can be written specifically for the DCMs:

$$l_{DCM,j}(\lambda) = \frac{L_{DCM,j}(\lambda) - L_{DCM,mn}(\lambda) + L_{span,j} - L_{span,mn} + L_{filt,j}(\lambda)}{[(g*(\lambda) + \alpha(\lambda))\overline{Inv}_{opt} - \alpha(\lambda)]} \quad (15)$$

By using the approaches described here it is possible to guarantee that the gain spectrum will be flat while cascading an arbitrary number of modified modules. This however does not guarantee adequate optical performance in terms of NF and output power. As stages are cascaded, noise can accumulate if care is not exercised. The NF penalty produced by placing loss between stages of amplification in an EDFA is easily explained by realizing that an EDFA produces spontaneous emission (SE) that is amplified to become amplified spontaneous emission (ASE) through the amplifier. SE produced at each point in the amplifier travels through the following gain and increases the ASE at the output. The signal travels through all gain and loss elements while part of the ASE is generated after some gain or loss and only travels through the remainder of the amplifier. So, the more loss at the front end of the EDFA, the more disadvantage the signal encounters and the worse the NF. The NF can be mathematically represented (in dB units) by:

$$NF(\lambda_S) = 10\log 10\left[\frac{1}{g(\lambda_S)} + \frac{P_{ase}(\lambda_S)}{g(\lambda_S)h\nu_S B_o}\right] \quad (16)$$

where $g(\lambda_s)$ is the amplifier gain expressed in linear units, $P_{ase}(\lambda_s)$ is the output ASE within optical bandwidth $B_0$ and $\nu_s$ is the frequency of signal light. The first term is signal shot noise and is usually small compared with the second term, the signal-ASE beat noise. If multiple stages of amplification produce gains $g_i$ and noise figures $nf_i$ and are interleaved with losses $l_i$, the total EDFA noise figure (in linear units) can be approximated (neglecting the small shot noise term) by:

$$nf_{tot} = l_o nf_1 + \frac{l_o l_1}{g_1} nf_2 + \dots + \frac{l_o l_1 \dots l_{n-1}}{g_1 g_2 \dots g_{n-1}} nf_n \quad (17)$$

The NF of stage 1 normally dominates this expression, but as the loss between stages 1 and 2, $l_1$ approaches the gain of stage 1 $g_1$, the overall NF begins to include contributions from the second stage. Similarly, other stages can contribute to the NF if the gain experienced before entering the stage becomes small. So, since modules designed as described above contain EDF, they can be a noise contributor under certain conditions.

Figure 8:
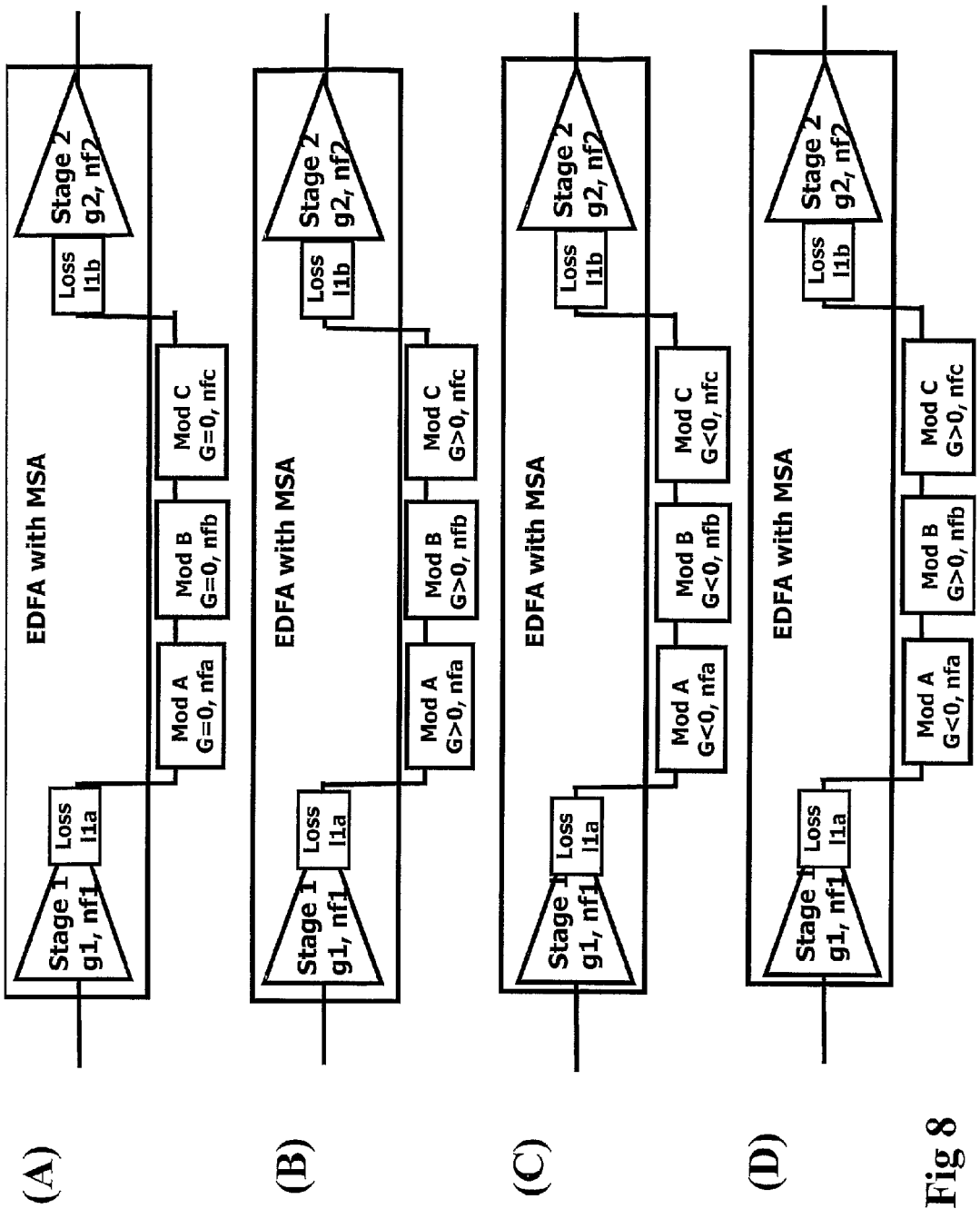
FIG. 8: Cascading of modules with various gains and NF values at the MSA of an EDFA. A) all modules 0 dB gain (requiring small pump power), B) All modules with G>0 dB (requiring larger pump power C) All modules with G<0 dB (unpumped) D) mixed logical pumping scheme.

To illustrate one way to optimize the NF of a cascade of EDFAs and FIOMs designed as above, 3 cases are illustrated in FIG. 8. In case A, all functional modules operate with 0 dB of gain. If designed as described above, these modules produce gain flatness and 0 dB of gain and require a carefully controlled pump diode in each module to set the EDF gain in the module equal to the sum of the module fixed and filter losses. In this case, all EDF stages in the EDFA and modules may contribute noise. The overall NF is approximated as in Eq. 18 (noting that all module gains are 0):

$$nf_{tot,A} = nf_1 + \frac{l_{1a}nf_a}{g_1} + \frac{l_{1a}nf_b}{g_1} + \frac{l_{1a}nf_c}{g_1} + \frac{l_{1a}l_{1b}nf_2}{g_1} \quad (18)$$

This is the most obvious way to make modules that are interchangeable and produce overall gain flatness. Unfortunately, the NF includes contributions from all stages and all modules require independent pump control, which is an expensive nonoptimal approach. In approaches B and C, the modules operate with nonzero gain. In general, the NF can be written:

$$nf_{tot,gen} = nf_1 + \frac{l_{1a}nf_a}{g_1} + \frac{l_{1a}nf_b}{g_1 g_a} + \frac{l_{1a}nf_c}{g_1 g_a g_b} + \frac{l_{1a}l_{1b}nf_2}{g_1 g_a g_b g_c} \quad (19)$$

In B, all modules produce positive gain and hence, require a pump. However, the pump power can be turned up as high as possible to maximize the gain and minimize the NF contributions from all successive stages and modules. In the limit of high pump on all stages the NF in case B can be approximated:

$$nf_{tot,B} \approx nf_1 \qquad (20)$$

In reality, this approximation only holds for a few modules. As more modules are cascaded, successive modules do not produce as low a NF because the input to the later modules becomes large. However, case B is clearly superior to case A in producing a low NF and it requires the same number of pump modules with much simpler control. Because Eq 7 holds, as long as the modules are designed as described above, the overall gain is flat as long as the overall gain is held at the design point. In case B, none of the modules operate independently flat, but together the overall spectrum can be flat.

Case C shows the other extreme case, a design in which all modules produce loss. Such a design is advantageous because it can be achieved without the use of any pumps in the mid-stage modules and is therefore quite inexpensive. However, in this case, all terms in Eq. 19 contribute to the overall NF. In fact, not only do they contribute but later stages contributions are enhanced by the losses (linear gains below 1) of all previous stages. The NFs of these later stages are poor, so the overall NF becomes quite high. Hence, case C is inexpensive but poor in NF performance. However, it should once again be noted that, as long as the last stage of the EDFA produces the overall design gain (by reaching the design output power) and the modules are designed as described above, the spectrum is flat. Case D shows an interesting compromise. In this case the first module is operated with loss and without a pump but then subsequent modules include a pump and produce gain. If the gain levels are high, the overall NF can then be approximated:

$$nf_{tot,D} \approx nf_1 + \frac{l_{1a} nf_b}{g_1 g_a} \qquad (21)$$

This approach produces a low NF, especially if the loss of module 1 is not large, but it does not require all of the extra pumps of approach B.

What is clear from these examples is that the optimum results are obtained by either operating the modules as designed by the new approach with a large gain (high power pump) or with a loss (no pump). The first case produces the lowest NF, the second case requires the least pumps and is least expensive. In no case is it advantageous to operate the modules as purely transparent (0 dB gain) modules.

Figure 9:
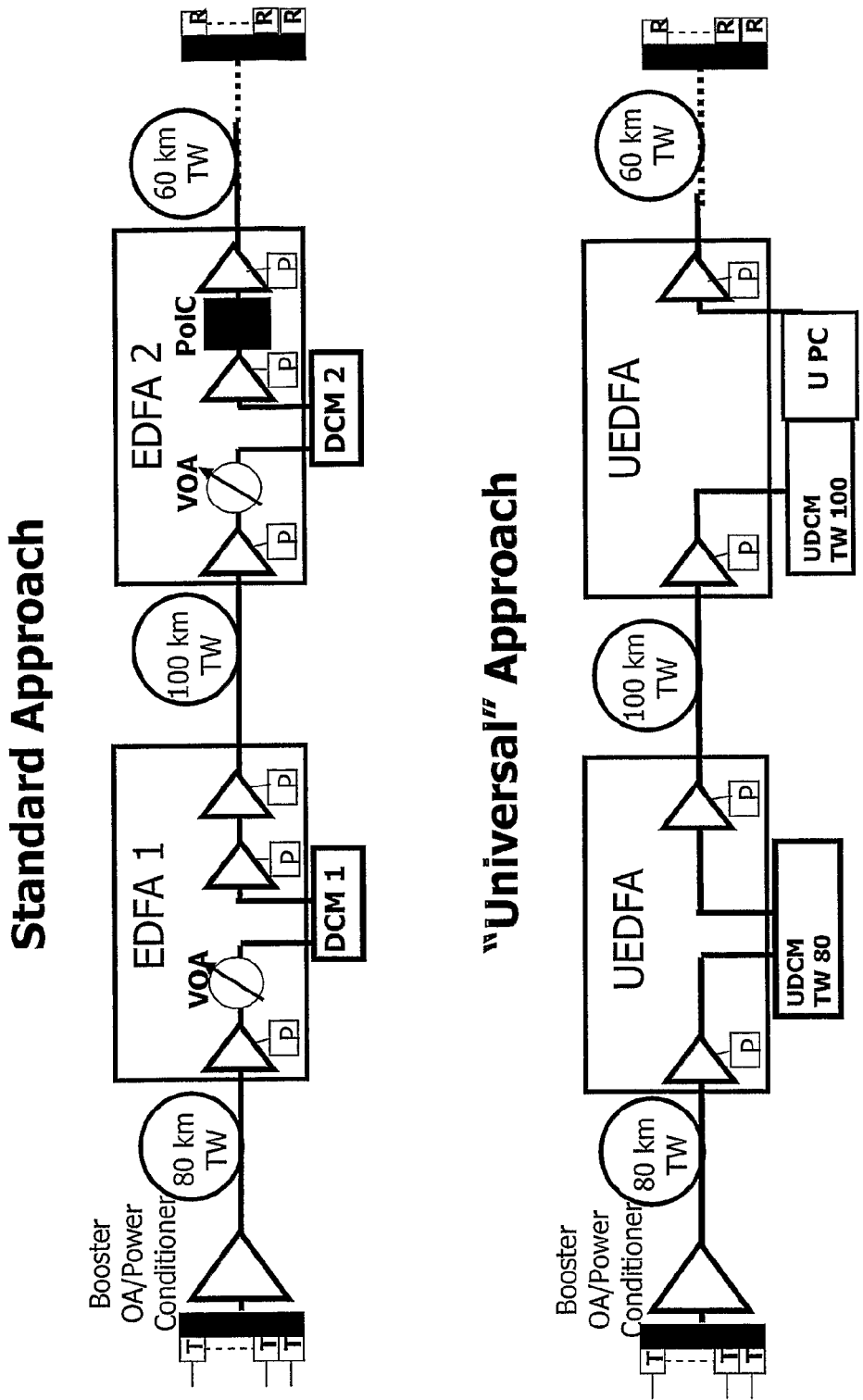
FIG. 9: Comparison of standard approach and universal approach in point-to-point system.

An example is useful to show how the approach described here is advantageous in an optical network. FIG. 9 shows an exemplary optical link in which optical span lengths are different. In a real network, both the lengths and the type of transmission fiber used in each span may vary, leading to different amounts of DCM loss as well as different DCM fiber types. As shown in FIG. 9, the standard approach to dealing with this variability is to include a VOA in every EDFA and to add loss to the EDFA whenever the DCM produces less than the maximum loss. Additionally, in the standard approach, when a new functional module such as a polarization controller is to be added to the amplifier, a new custom amplifier design with the module is produced to accommodate its loss. On the other hand, the new approach disclosed here is to add EDF to each DCM, customized to the loss of the DCM as described in Eq.13. Similarly, EDF is added to the polarization controller or other functional module in a manner defined in Eq. 13. This creates the new approach shown in FIG. 9.

Several types of EDF modified modules according to this invention are shown in FIG. 10. These include filtered and unfiltered modules, pumped and unpumped modules, 1480 nm pumped and 980 nm pumped modules, modules with pumps bypassed around losses, modules with multiple pumps and many other variations. Any variation of module that includes EDF designed as described above and a lossy functional module is included. The addition of isolators, WDMs, etc is a modification that does not alter the design of the modules. A design rule for such modules is expressed by Eq. 13. This expression can be written in an alternate way to show a unique property of these modules. The length of the module and filter in the module are chosen such that, if the EDF were pumped just enough to achieve transparency (overcome the loss of all components), the module gain would satisfy the formula for all wavelengths:

$$G_{mod,trans}(\lambda) = [(g^*(\lambda) + \alpha(\lambda)) \overline{Inv}_{trans} - \alpha(\lambda)] l_{mod} - L_{filt}(\lambda) - L_{mod} \approx 0 \qquad (22)$$

Eq. 22 is fundamentally the way to identify a module designed according to this invention. It states that the erbium fiber length and any filter present are chosen such that, if the erbium were pumped to reach an average of 0 dB module gain across the wavelength band of interest, it would produce flat gain. Since no filter is quite perfect, the degree of flatness is relative. For unfiltered modules, the degree of flatness is controlled by the shape of the EDF gain spectrum at the optimum inversion level. It should be recognized that, as long as the module is designed to achieve (to within 0.2-0.5 dB) the best gain flatness with the included components when operated with an average 0 dB gain across the band, the design is according to this invention. For example, with a GFF included, 0.1 to 0.2 dB gain flatness might be achievable across the C-band limited by the filter making process and its ability to match the EDF gain shape. Without a GFF included, the EDF itself might create 0.1-0.5 dB or more gain ripple at the optimal length and EDF inversion to produce 0 dB average gain across the band. For the EDF of FIG. 1, the inversion that creates the least gain ripple between 1528 and 1563 nm is 0.638. Any module that produces an average of 0 dB gain without a filter and an EDF inversion near 0.638 dB is designed according to this invention for that wavelength band of operation.

It is also noted that the universal module need not be located at the midstage of an amplifier. In particular, many networks are built with amplifiers not containing a midstage access point. In such situations, a universal module can be placed preferably at the input end of the amplifier or less preferably at the output of the amplifier. The reason the output location is less preferred is that this location requires the module itself to contain a pump that can be adjusted to guarantee that the node experiences the overall same average gain. This requires significant control communication between the amplifier and the module, an operating condition that is achievable but more challenging than a free-running uncontrolled module design.

The discussion above might imply that the modules according to this invention are designed to operate flat with 0 dB of gain. This is only the signature of such a module, but not its operating condition. It is obvious that such a module operated with 0 dB flat gain can be used at an MSA without affecting the EDFA. However, an important distinction to be made about this invention is that the modules according to FIG. 10 are not optimally designed to operate in a 0 dB gain condition when in operation in a system. An unpumped module (FIGS. 10C and D) necessarily produces loss with any channel loading condition, because it has no means of producing gain. A pumped module (FIGS. 10A, B and E) typically is operated with maximum pump power and produces gain >0 dB for all operating wavelengths. Operation of a module with 0 dB gain is not the optimal solution. It requires the launch and careful control of a pump operated to produce 0 dB of gain, and the result is a worse NF than when the module is pumped fully. The essence of the invention is that the modules do not operate with 0 dB of gain but rely on following power EDFA stages to produce the flat overall spectrum and output power.

The discussion above has uniformly described the case in which the node is designed to operate with a flat gain. However, many amplified networks do not operate this way. In particular, multichannel optical transmission spans can produce nonlinear optical effects we signal power is high. One such effect is Raman amplification in which short wavelength channels produce gain for longer wavelength channels, thereby experiencing loss. The net effect is that a transmission span experiences a gain slope across the channels, with shorter wavelength channels experiencing greater loss in the span than longer wavelength channels. Additionally, Raman gain can be deliberately applied to the span via added span pump power. The result of any of these effects is that the amplified node is often specified to create a gain slope to compensate for the span slope. For the purposes of this disclosure, the slope of the gain spectrum of a device or link is given by the coefficient S in the following formula:

$$G(\lambda)=S\lambda-I \qquad (23)$$

where:

G is gain in dB, logarithmic units

S is the slope of the best fit to the gain across the operation bandwidth in dB/nm I is a constant offset for the best fit in units of dB where this formula represents the best straight line fit to the gain spectrum over the operating bandwidth.

It is then desirable that a universal module have the property that it not only maintain gain flatness of a node but that it can also guarantee that the gain slope is maintained when inserted in a node where a particular slope is desired. Flat gain is, in this context the condition at which the slope S=0. In a practical sense, flatness is only typically achieved to within some specification. Many systems require flatness to within some tolerance typically 0.5 to 1.5 dB across a typical bandwidth 20-30 nm. This implies for flatness an approximate condition:

$$\text{Flat gain condition: } -0.05<S<0.05 \qquad (24)$$

While flatness could also be defined by a maximum excursion of gain for all channels present in a system, such a definition is problematic because it depends on the channels present. The definition given here depends only on the gain shape, not the particular operating condition.

The universal modules defined above have this property. Since these modules are designed such that they would have flat gain if operated with 0 dB average gain, and because gain is interchangeable between modules and amplifiers, it stands to reason, and in fact can be confirmed that the addition of such a module does not change the slope of the overall node, even though the module does not operate with 0 dB gain.

Another important point is that real systems often consist of amplifiers from different vendors that may contain different gain fibers with somewhat different compositions. In the case where the fibers are of similar compositions and hence similar ion spectral shapes, the equations above hold exactly. However, when this is not true, shifting gain from the module to the amplifier in a given node may lead to an improvement or a penalty in the flatness or slope achieved. It is however true that the universal module designed as described above is substantially better at achieving overall flatness than a module with only a passive functional element. The reason is that all ions of a given type have similar spectral shapes, regardless of host and are far more similar to each other than they are to a flat spectrum. So the universal modules can be used in a network with mixed amplifiers of the same ion type and still be advantageously applied, even if not perfect in performance.

Another characteristic of a universal module is even more subtle and of unique value. A universal module can be placed not only at a system node but can actually be added within an existent span, in some sense creating a new node. As an example, a pumped universal module with an add/drop functional component could be added in the middle of a span to drop and add traffic at a new location in a network. In this case, if the input of the universal module has slope $S_{in}$, for noise performance reasons the module is operated with gain and hence does not have slope S=0 (which it would have if its gain were 0 dB). In fact the module would in this case typically have S<0. Hence, the slope at the output of the universal module would be $S_{out}<S_{in}$, the power of the signals at the output of the module would be higher than at the input, and the slope would not be as originally designed for the portion of the span after the module. However, the universal property of such a module guarantees that an amplifier at the following node can correct these differences such that the slope at the output of the next node would in fact be as designed in the system without the midspan universal module.

Figure 11:
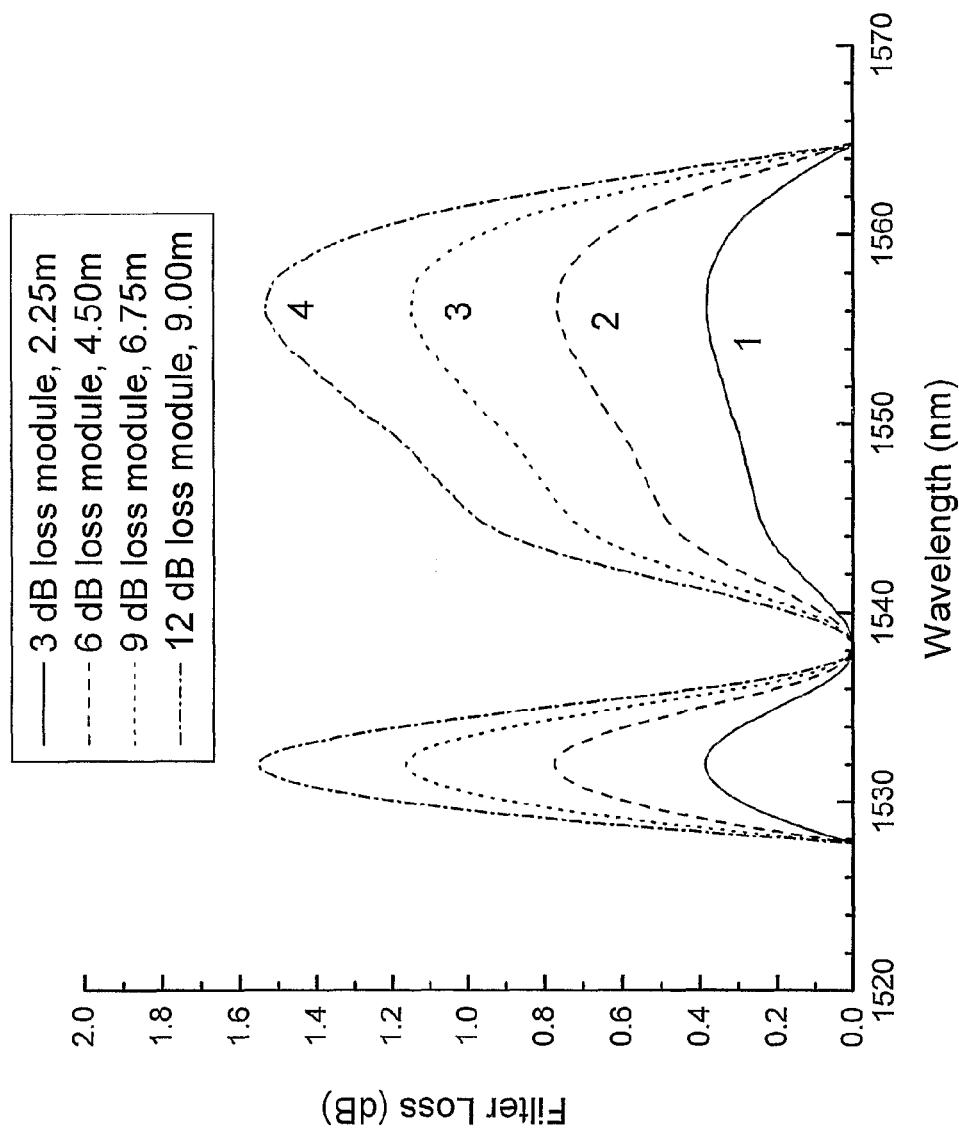
FIG. 11: Series of clean-up filters with equally scaled loss, module fixed loss and EDFA length to achieve universal modules
Figure 12:
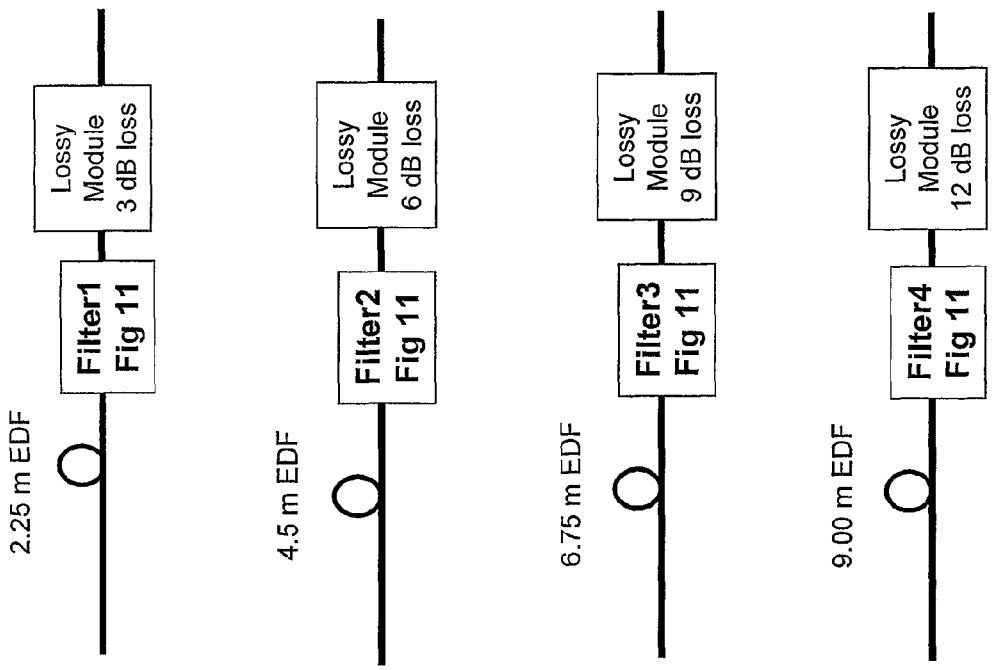
FIG. 12: Exemplary module design using filters of FIG. 11 to achieve universal modules.

As an example of the design of filters according to Eq. 22 and this invention, one combination of filters and EDF lengths (fiber as in FIG. 1) for a series of modules with different losses, is shown in FIG. 11. All of these modules were chosen to satisfy Eq. 22 with an EDF inversion of 0.638 (but not to operate at this condition). Then, the length of the EDF and the magnitude of the filter in the module both scale linearly with module loss. So, in the example for module losses of 3, 6, 9 and 12 dB, the EDF lengths are chosen to be 2.25, 4.5, 6.75 and 9 m respectively and the filter peak magnitude is 0.39, 0.78, 1.17 and 1.56 dB respectively, with all filter shapes being scaled versions of each other. A series of unpumped filtered modules designed using these filters in illustrated in FIG. 12.

Figure 13:
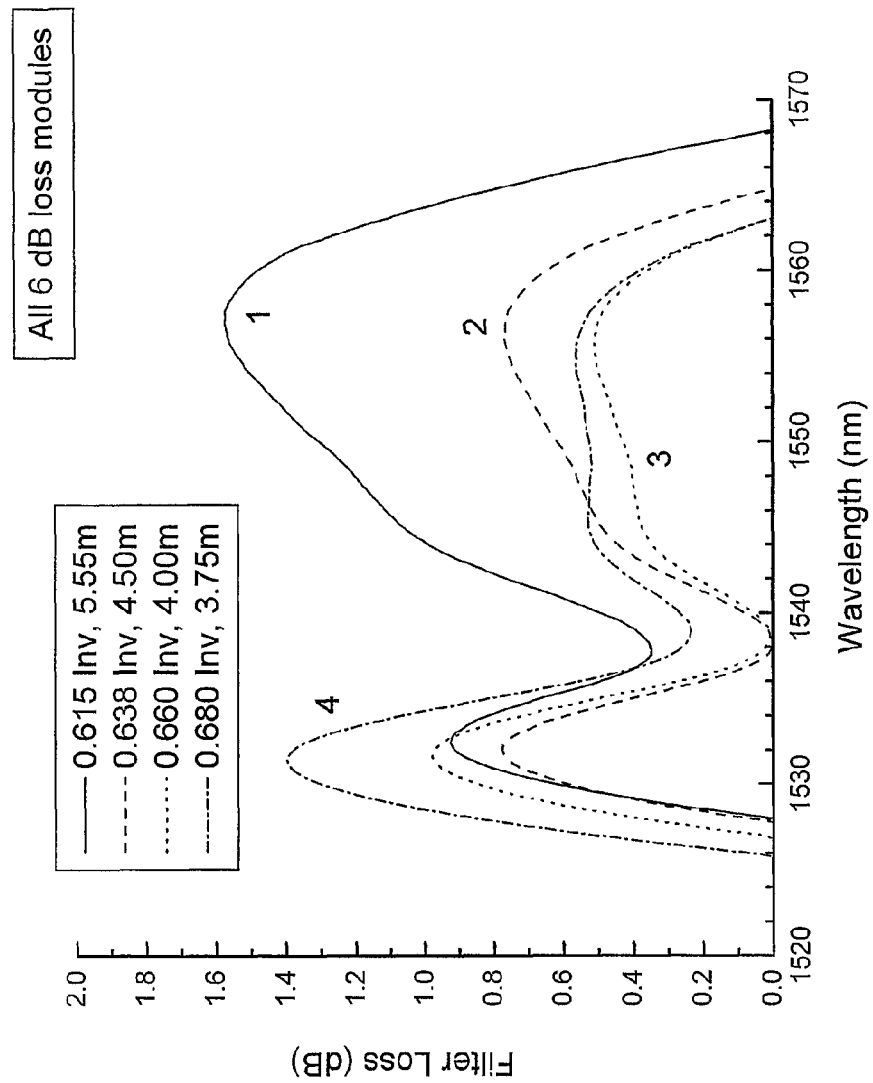
FIG. 13: Series of clean-up filters with different shapes for 6 dB module fixed loss and different EDFA lengths to achieve universal modules
Figure 14:
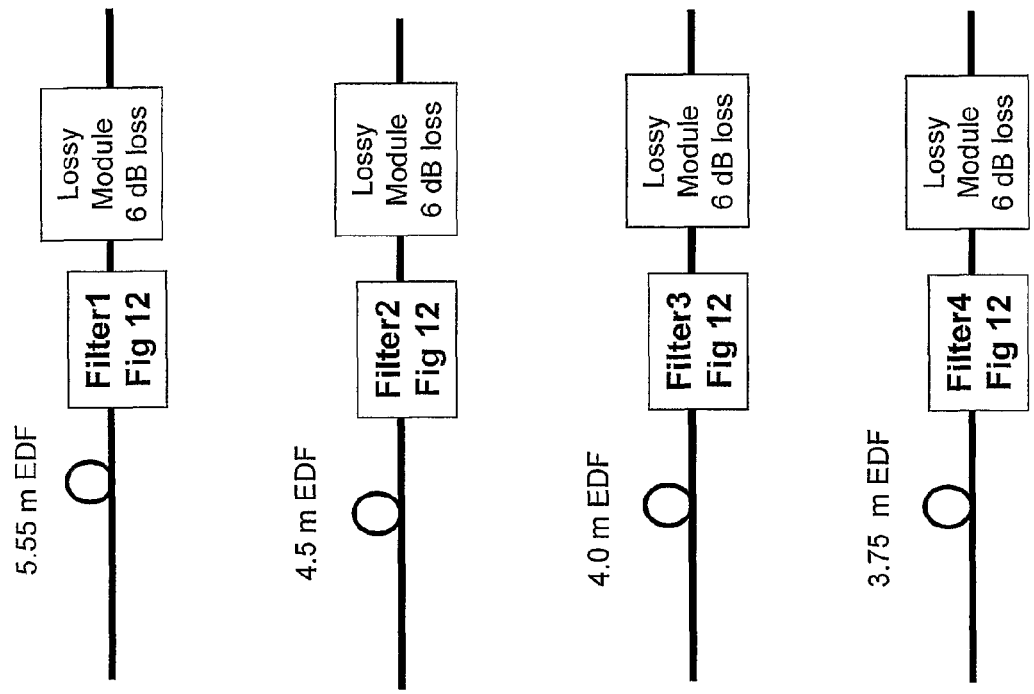
FIG. 14: Exemplary module design using filters of FIG. 13 to achieve universal modules.

Clearly, Eq 22 can be satisfied for a variety of different inversion levels, assuming that any arbitrary filter shape is possible. A few examples of this are shown in FIG. 13 for a module with 6 dB insertion loss. In this figure, several combinations of fiber length, filter shape and inversion are shown, all of which satisfy Eq. 22. In all cases, a module with 6 dB fixed loss, the chosen filter, the EDF length and inversion as shown would be gain flattened with 0 dB of gain. These designs are illustrated for an unpumped module in FIG. 14. All would operate as desired without a pump or with a large pump as long as they are followed by a power stage of an EDFA that produces the desired overall gain regardless of the operation of the module. FIG. 14 could just as easily be drawn with a pump present, with isolators and other components as long as the overall fixed module loss is 6 dB as designed.

Figure 15:
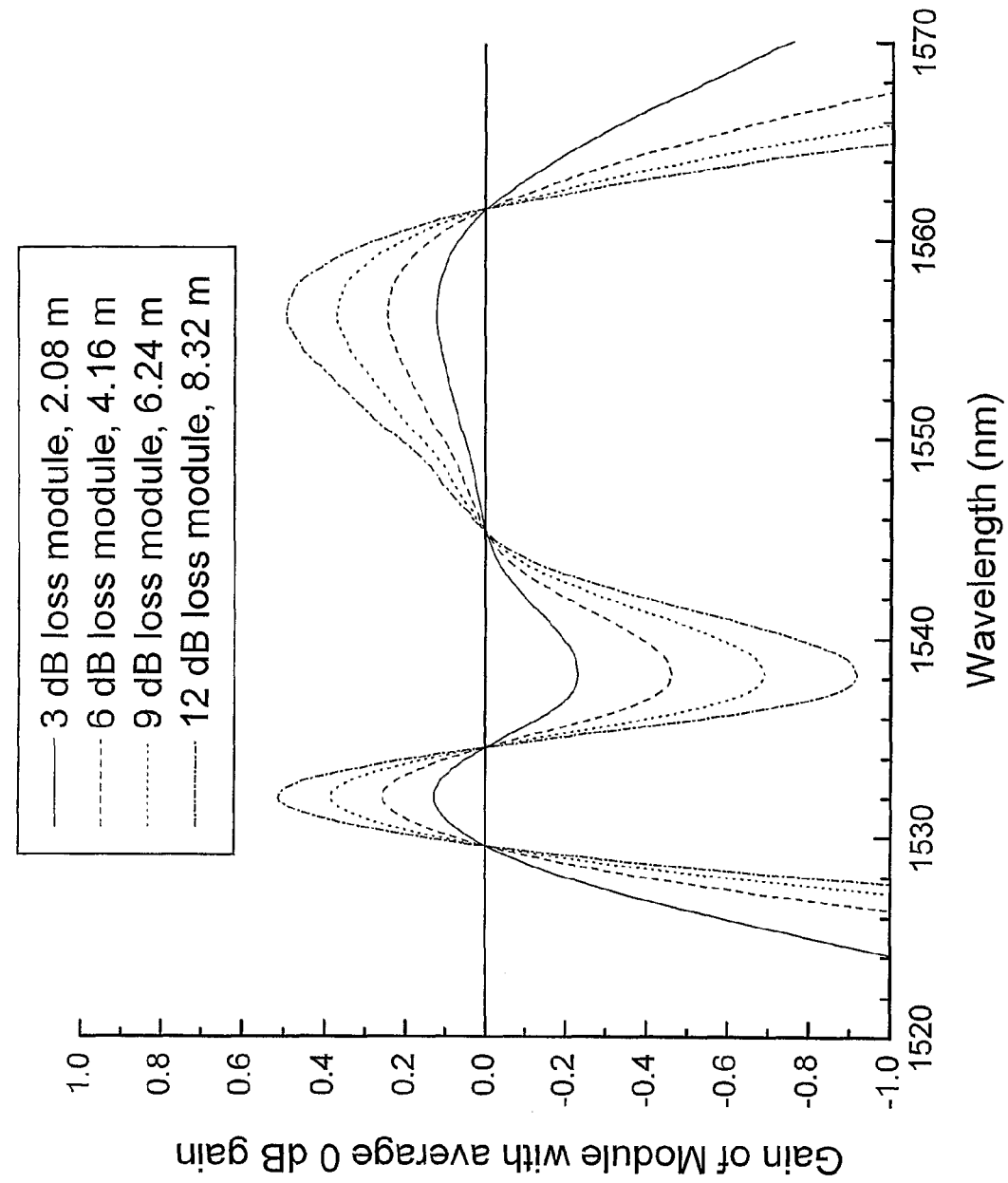
FIG. 15: Exemplary gain shape achieved by universal modules with different losses without cleanup GFFs when optimally designed to average 0 dB gain as required by Eq 22.

As another example, a module without a GFF has substantially less freedom in design than the filtered examples above. To satisfy Eq. 22 for a known module loss, only one choice of EDF inversion and EDF length produces the least gain ripple if the module were pumped to average 0 dB gain. The inversion for this EDF, as mentioned above is about 0.638 for the 1528-1563 nm wavelength band. The combinations of EDF lengths and resultant gain for different unfiltered modules are then shown in FIG. 15. The gain ripple is about 0.1 dB for each 1 dB of module loss in this operating band. While the spectrum is not flat, it is the best that can be achieved with this fiber without a filter and hence the design is according to this invention. Note that the length of fibers in FIG. 15 is shorter than those in the filtered case of FIG. 11. This is because the length for the EDF in the filtered case must be made longer to adjust for the average filter loss. In the unfiltered case, both negative and positive gain values around 0 dB are produced to achieve the 0 dB average and less EDF is required to satisfy as best as possible Eq. 22.

Example

A detailed example is helpful in understanding the description above. It should be noted though that this is only an example. The number of gain stages, the amount and configuration of pumps, the number and wavelengths of signals, the detailed filters, fiber lengths and extra components may all be varied while still creating a modular system according to this design. The system may operate in the C-band or L-band or some hybrid design with both bands.

Figure 16:
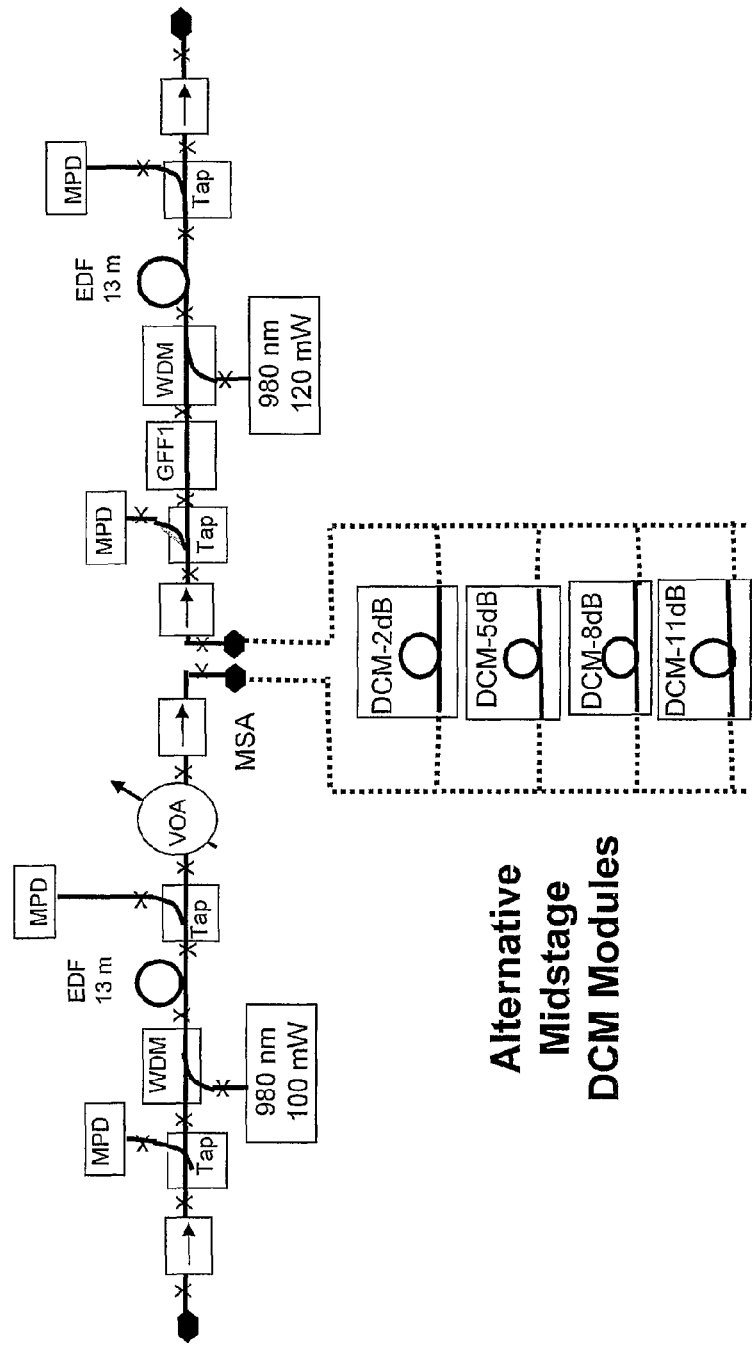
FIG. 16: Standard design example for 20 dB gain, 17 dBm output power with 2 980 nm pumps and VOA with a wide range of possible midstage DCMs

In this example it is assumed that 36 channels spanning the wavelength range 1528-1563 nm (1 nm spacing) are present with equal power and an aggregate input power of −3 dBm. The output power target is 17 dBm, with 20 dB of gain at all wavelengths (to within a small tolerance). The design is to maintain flatness regardless of DCM module places at the MSA. 2 to 11 dB of DCM loss is assumed to be possible. One design according to the standard approach to such a design is shown in FIG. 16. A VOA is used in this design to guarantee that the total wavelength independent midstage loss is constant. In this case, the loss is 14 dB (11 dB max DCM+1 dB VOA insertion loss+2 dB for other components). Additionally a GFF is placed at the same midstage.

It is assumed that 100 mW of 980 nm pump is used in the first stage in FIG. 16 and 120 mW is used in the second stage. The length of the 2 stages totals 26 m, and the optimal split is shown in FIG. 16. The GFF for this design is GFF1 shown in FIG. 18. The combination of lengths and filters was optimized over a wide parameter space and this was the optimal design reached. The VOA setting is chosen to guarantee the same 14 dB loss. 4 DCM modules, designated by their total insertion loss are shown as options in FIG. 16. They produce 2 dB, 5 dB, 8 dB and 11 dB of loss respectively and the VOA is set at 9 dB, 6 dB, 3 dB and 0 dB of adjustable loss in these 4 cases in order to maintain a total of 14 dB loss (including 3 dB other losses).

Figure 17:
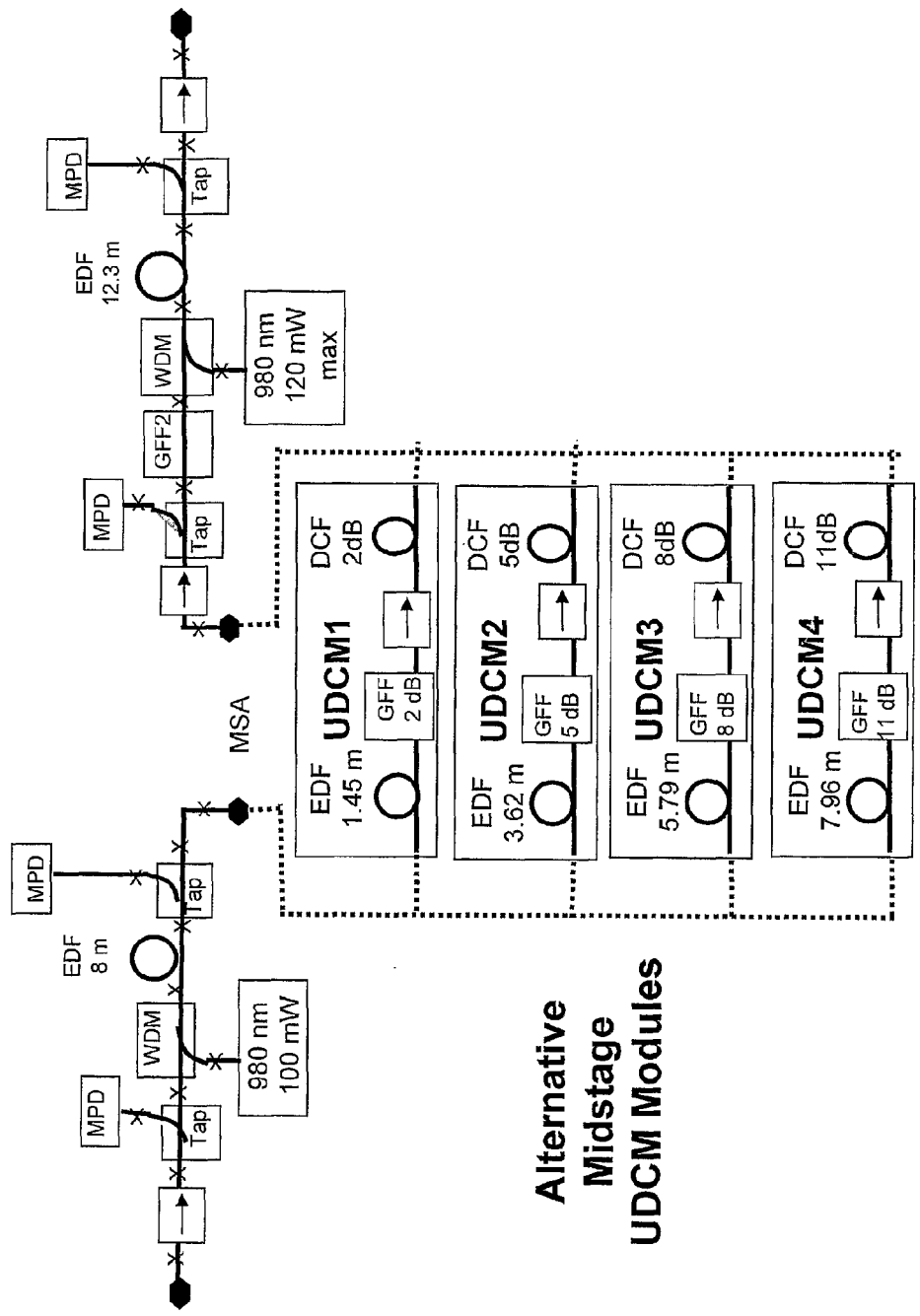
FIG. 17: Universal design example for 20 dB gain, 17 dBm output power with 2 980 nm pumps without a VOA with a wide range of possible midstage universal DCMs of design shown.
Figure 18:
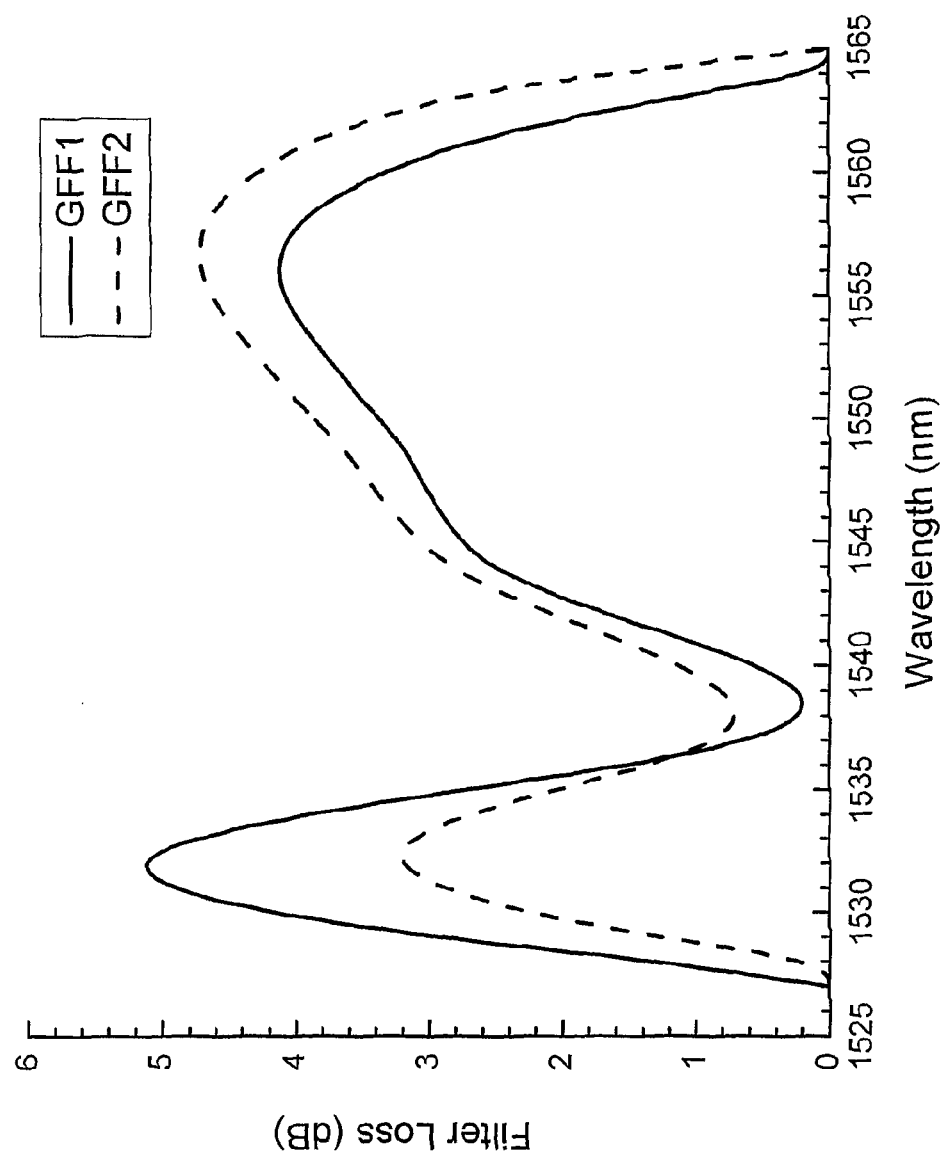
FIG. 18: Main EDFA filters used for FIG. 16 and FIG. 17 designs
Figure 19:
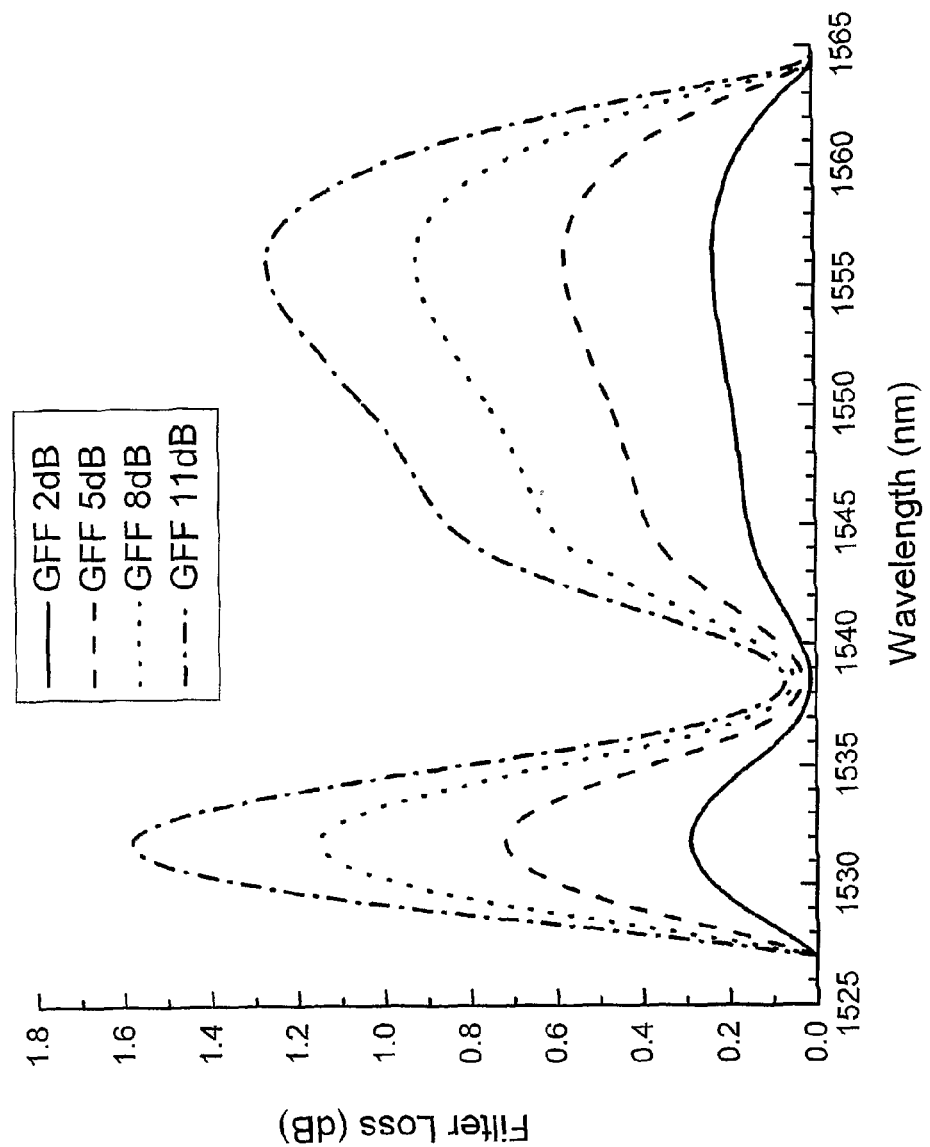
FIG. 19: Cleanup filters used in UDCMs shown in FIG. 17.

In comparison, a system designed according to the present invention is illustrated in FIG. 17. In this case a 2-stage EDFA without a VOA is used and the DCM modules are modified according to the present invention with unpumped EDF and cleanup filters. These universal DCMs are able to produce the correct result according to Eq. 22 such that, regardless of the DCM used, the overall EDFA spectrum is flat. In fact, it should be noted that the maximum pump power in the EDFA is the same as in FIG. 16 except that, as the DCM is reduced to lower loss values, the pump does not require its full maximum power. This was not true in the design of FIG. 16 where the operation of the EDFA is unchanged, except for VOA setting for all DCMs The design of FIG. 17 uses a different filter labeled GFF2 as compared to that used in FIG. 16. GFF2 is shown in FIG. 18 along with GFF1. Additionally, the cleanup filters in each DCM case are shown in FIG. 19 and the lengths of EDF used in the FIG. 17 design are shown in FIG. 17. These are chosen such that each module is designed consistent with Eq. 22.

Because no VOA is present, the maximum loss at the midstage when the 11 dB module is present is only 13 dB since the VOA insertion loss is not present. However, the loss is distributed differently, along with some additional EDF in the universal module approach. The loss also varies from 13 dB to 4 dB depending on which DCM is present.

Figure 20:
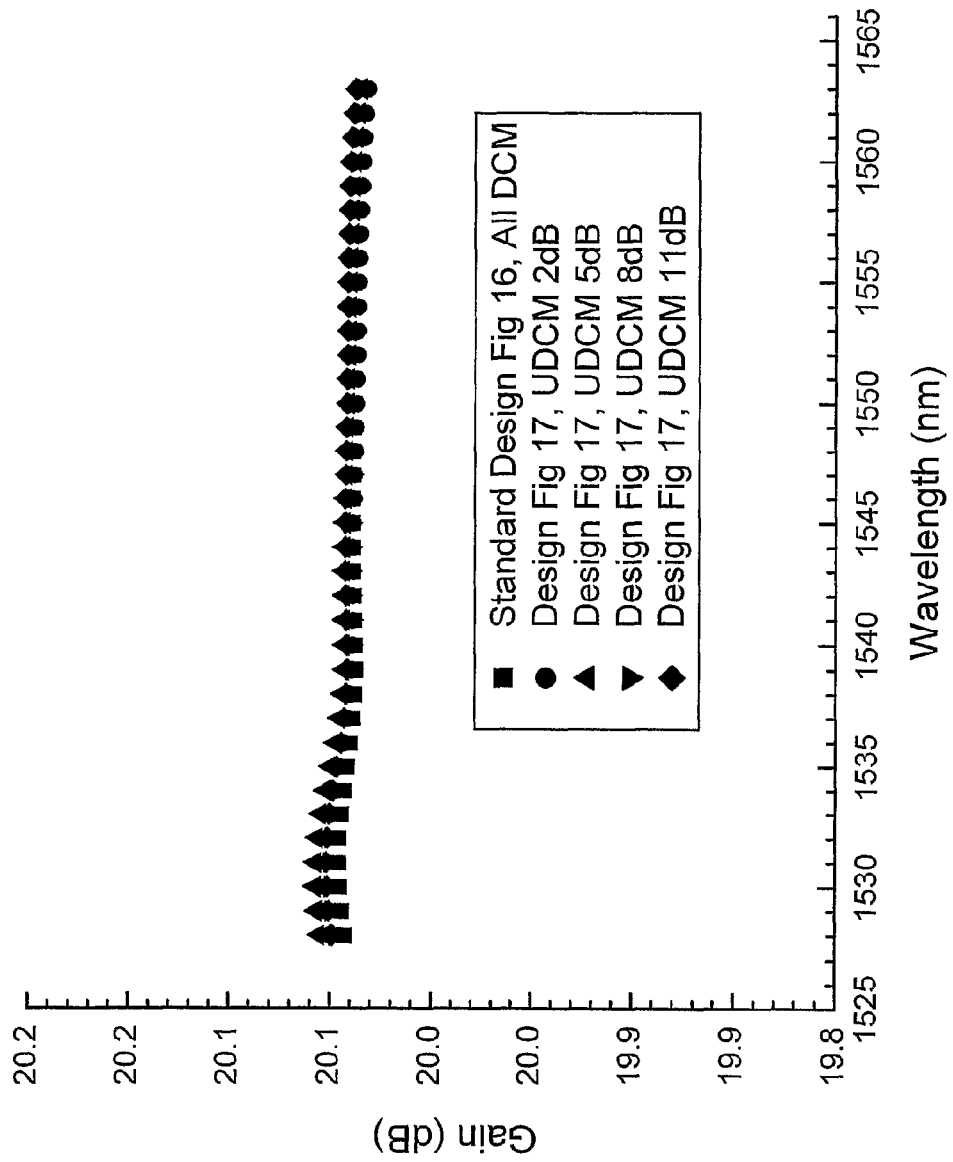
FIG. 20: Gain achieved by designs of FIGS. 16 and 17.

In both designs, an input loss of 1.1 dB and an output loss of 0.8 dB was assumed to account for the components shown. Both designs were modeled using a standard EDFA computer model with verified accuracy in gain and NF to within 0.5 dB for the most extreme cases one might model and tighter tolerances for typical cases like the one treated here. The modeled gain spectrum of these designs is shown in FIG. 20. Because all filters were designed to be perfect, the flatness is perfect in all cases to within the accuracy used in generating the filters shown in FIGS. 18 and 19. The only ripple in gain is due to the inaccuracy of setting pump power and filter designs. For the standard design of FIG. 16 the same result is observed for all DCM choices. For the universal approach of FIG. 17, the spectra vary slightly. However, of greater note, the pump power on the second stage was adjusted to 97, 108, 114 and 118 mW for 2 dB, 5 dB, 8 dB and 11 dB UDCMs respectively, while the pump power was 120 mW for all DCMs in the standard approach.

Figure 21:
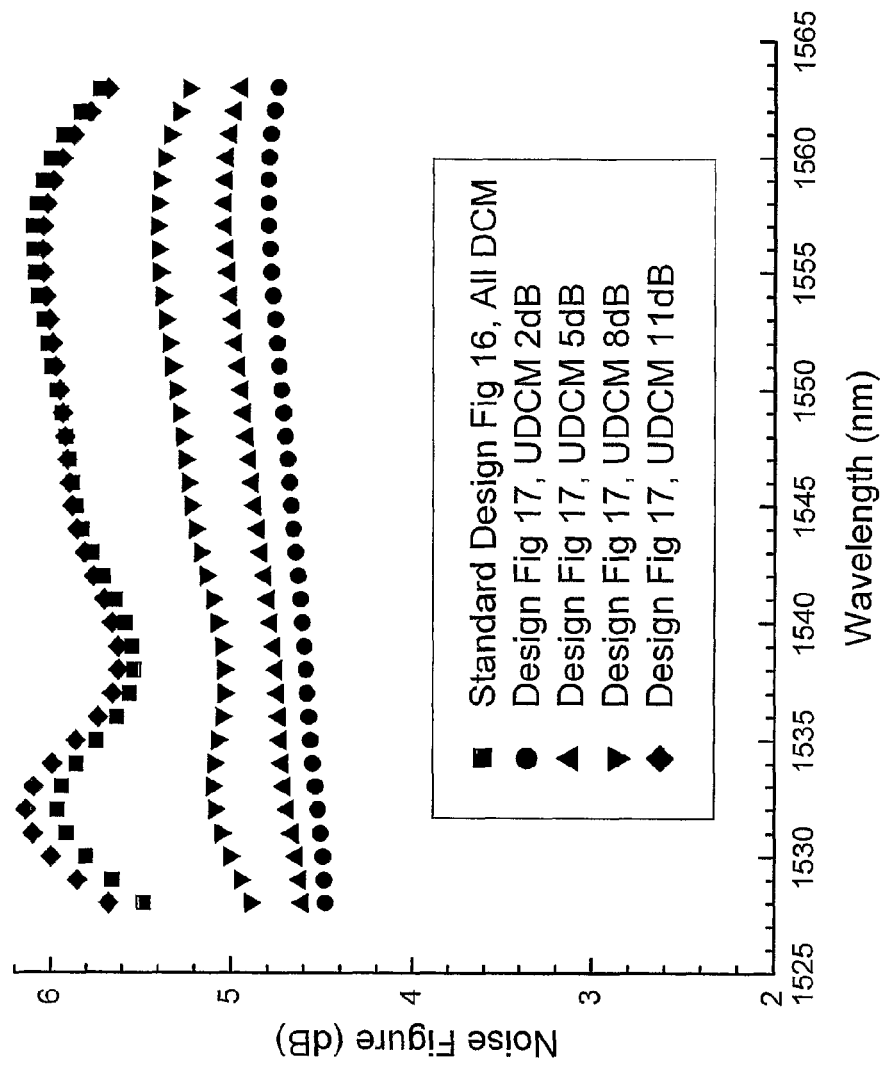
FIG. 21: NFs achieved by designs of FIGS. 16 and 17.

The great performance advantage of the universal module approach is best illustrated in FIG. 21 where the NF is plotted for the cases of FIG. 20. In the standard approach the NF maximum is about 6.1 dB and is independent of the DCM used. On the other hand, in the universal module case, the NF is much lower when the DCM loss is lower. For the 2 dB DCM the worst channel NF is 1.3 dB lower than the worst-channel NF with the standard approach. Even when the 11 dB UDCM is present, performance is comparable to the standard approach.

An optical system using universal modules benefits in almost every aspect when compared with a standard optical system without such modules. In particular:

1) Universal system requires less unique EDFAs (as shown in FIG. 9)

2) Universal system has less VOAs requiring less control software and leading to less system failures in the field 3) Universal modules are usable in many types of systems without modification.

4) Functions can be added using universal systems even when the system was not designed anticipating the functional module.

5) Universal system achieves improved NF performance for short spans and low loss DCMs. This translates to a greater transmission distance or greater system margin.

The performance advantage to a system is best described using a numerical example. If we assume a system is built using standard EDFAs as in the example above (6.1 dB worst-channel NF) and that a maximum of 12 spans is possible before electrical signal regeneration is required (S/N is adequate) then it is possible to compute the maximum number of spans possible when the NF is improved, as with the universal modules. Extending the logic of Eq. 17 to a system, the accumulated NF for a perfectly flattened system with each amplifier gain equal to the preceding span loss is just the sum of the NFs in linear units. For example, 12 identical EDFAs with 6 dB NFs a value of 4 in linear units with 20 dB of gain interleaved with 20 dB of loss would produce a total NF of 48 (12×4) or 16.8 dB.

Figure 22:
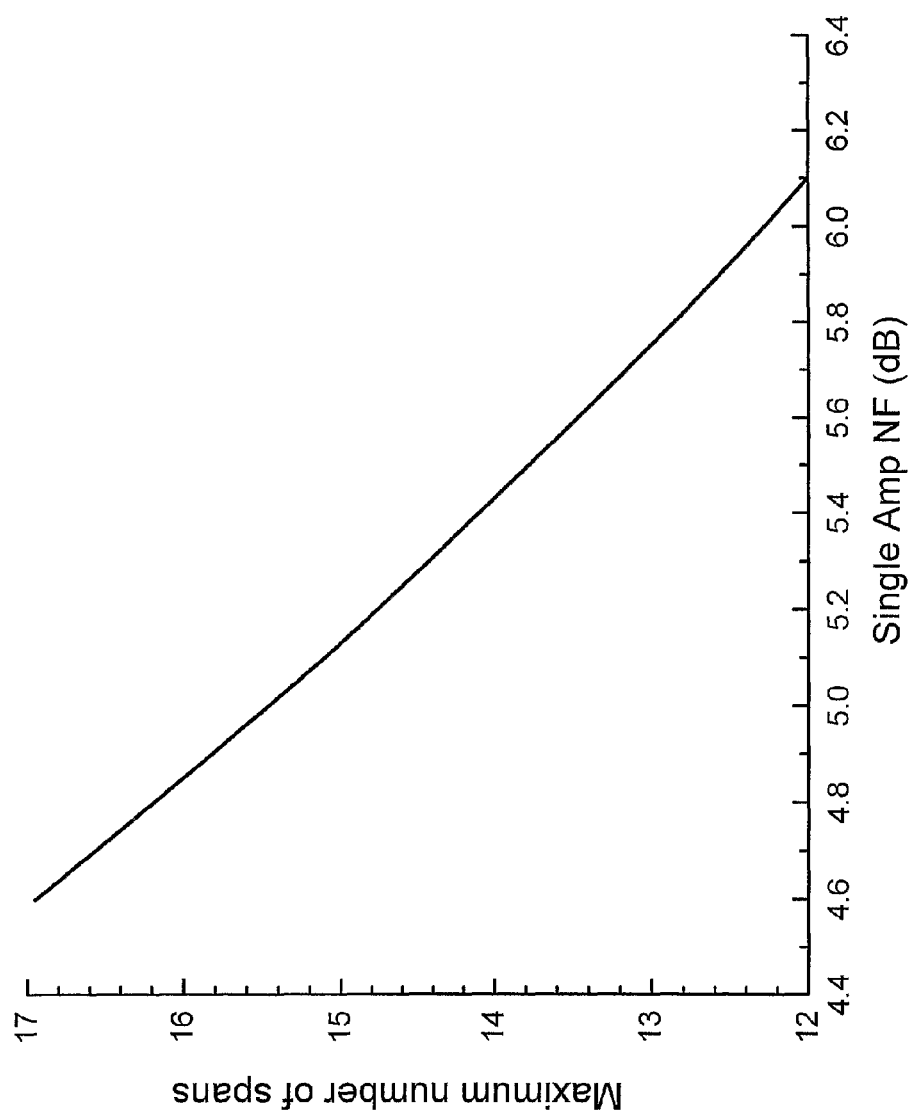
FIG. 22: Maximum number of system spans possible in hypothetical system designed to achieve 12 spans with 6.1 dB NF amplifiers when the NF is reduced for all EDFA nodes.

The maximum number of spans, assuming a lower NF when compared with a 12 span, 6.1 dB NF system is shown in FIG. 22. For a 4.8 dB NF, the system could reach over 16 spans. Hence, the NF advantages of FIG. 21 translate to up to 4 extra spans of transmission system for the minimum DCM loss case. This translates to greater distance or the ability to add other modules to the system. The advantages described here are only accrued when a substantial number of inline system modules are designed using the universal approach. For example, the use of a universal module in a single EDFA to achieve a 4.8 dB NF within a 12 amplifier chain would only reduce the overall NF by 0.1 dB. Hence, for a system to benefit substantially it might be said that 50% or more of the inline functional modules must be designed as universal modules according to Eq. 22.

While this disclosure thus far has described the design of a network with universal modules, it has not described another use for these modules, namely the upgrade of network functionality. By upgrade we mean the additional of functionality or the improvement of performance of an existent operating network. Some typical network upgrades might include:

1) the addition of a tunable dispersion compensator to better achieve necessary dispersion when operating at an increased bit rate.

2) the addition of a dynamic gain equalizer to achieve better flatness 3) the addition of a polarization controller to reduce polarization mode dispersion effects 4) the addition of an add/drop module to add or drop channels at a node that doesn't have such functionality.

5) the substitution of a different add/drop module for an existent add/drop module to achieve a different signal configuration.

This is by no means an exhaustive list but is meant as an example only.

The process of upgrading an existent broadband network using these universal modules is as follows:

1) Identify required upgrades and their locations (nodes or otherwise) in the network.

2) At each such location, identify the best location relative to existent modules and the best form of the module to be added.

3) Optionally: reroute signal traffic around location of upgrade via switches or routers using alternate network paths 4) Optionally: turn off amplifier/hardware at identified location.

5) Break link at chosen location and install universal module, including any control connections 6) Optionally: turn on amplifier/hardware turned off in 4)

7) Turn on universal module if it is active module

8) Restore traffic to node

9) Adjust pump power in node to achieve required Gain, which guarantees achieving a flat or ideally sloped spectrum as before the upgrade.

Because of the easily measured condition for a universal module, namely that it would achieve flat gain for 0 dB average gain across the band, it is possible to describe a method for making such modules without requiring insertion in a network or amplifier. In particular:

1) Build module with doped fiber length exceeding expected design fiber length

2) Attach module to a test set capable of measuring gain spectrum across the design wavelength range.

3) For unpumped module, insert a pump coupler and pump into signal path before or after module as appropriate to allow pump power to reach the doped fober in the module 4) Adjust pump (internal pump in pumped module, external pump in pumped module) until average gain is 0 dB and measure slope.

5) If gain slope is negative at 0 dB, the starting fiber was too short. If gain slope is positive at 0 dB average gain, shorten fiber and repeat steps 2-5.

6) If slope is 0, to within a tolerance, stop process, module is universal module. Disconnect from test setup and any added pumps.

The new method proposed in this article for building optical communications systems is far more general than the examples presented:

The approach is not limited to the type of EDF described in the article.

In addition to Erbium-doped Fiber Amplifiers, the method is applicable for the design of optical fiber amplifiers that are made with optical fiber doped with rare-earth elements other than Erbium.

The method is applicable to optical fiber amplifiers operating in bands other than just the C-band or L-band. An example is Thulium-doped optical fiber amplifiers operating in the S-band or Ytterbium-doped optical fiber amplifiers operating near 1060 nm.

The method is applicable to optical fiber amplifiers consisting of stages each of which may be made with different rare-earth doped optical fiber and with different concentrations of the doping elements in each stage. If the EDF in a functional module contains 2 times the dopant as the EDF as in an EDFA but only half as much of this EDF is used in the module as would be required by the design method for the other EDF, this constitutes a design according to the invention.

There are several ways that universal functional modules may be created by the concatenation of separately packaged rare-earth doped fiber and functional elements. For example, rare-earth doped fiber could be packaged as a jumper fiber with connectors at the input and output and connected inline to a functional element. In this case, if the length of the doped fiber is chosen such that, when the jumper and functional element are connected, the gain of the combined unit is flat when the average gain is 0 dB, the combination then collectively constitute a universal module according to this disclosure. Clearly, this is only one example of how the elements of the universal module may appear in separate packages that are combined in operation.

The method is compatible with optical networks that use combined Raman amplification with rare-earth-doped optical fiber amplifiers.

The method may be useful for Erbium-Doped Waveguide Amplifiers (EDWAs) in which the gain ions are doped into a planar waveguiding structure. Clearly, erbium ions in any form or in a combination of different forms could be used in the manner described. In particular, for cost savings, unpumped or pumped EDWA gain medium might be used in modules and combined with an EDFA in a system. Such an approach is consistent with this disclosure as long as the EDW containing module is designed according to the equations contained herein.

The last point is worthy of further explanation. While an EDW containing module could theoretically meet the requirement, namely that it be gain flat when its average gain $G=0$, there are critical differences that makes this problematic. In going from Eq. 1 to Eq 2 above we assumed the background loss of the fiber is negligible. This assumption was important to much of the analysis that followed. This condition is true of virtually all fibers but not true of any waveguides. For example, the typical EDF has a background loss of 1-10 dB/km, while the typical EDW has a background loss of 0.2-1 dB/cm, about 100000 times higher than the EDF. Hence, even a short length of EDW may contain as much background loss as the lossy FIOC to which it could be added. Secondly, attaching an EDW in line with most fiber components is problematic because waveguide and fiber modes are different and loss results. Thirdly, the method for making the universal modules described above is not possible to implement with EDWs because EDWs must be fiber pigtailed and are difficult to shorten once pigtailed. Length can only be easily changed by replacing the EDW. Since the background losses of different EDWs and their attachment loss varies dramatically, achieving flatness with G=0 dB by such adjustment is not currently possible. Finally, the example above illustrated all of the advantages of this approach using EDF in improved performance for a system link. However, using the background loss of an EDW in this example, the performance would have been degraded by the universal module, not enhanced when compared with a standard VOA approach.

The invention claimed is:

1. A network node for transmitting signals from an input fiber span to an output fiber span operating over a particular bandwidth $\Delta\lambda$ with a gain slope $S_{opt}$ across the particular bandwidth $\Delta\lambda$ when operating at an operating average gain level G across the particular bandwidth $\Delta\lambda$ comprising:
   at least one broadband optical amplifier that includes at least a first segment of rare-earth doped fiber, an optical source of pump light and an optical coupler for coupling the pump light into the rare-earth doped fiber;
   at least one inline functional module coupled to an input or output of the optical amplifier in an inline manner to define an inline path, wherein said functional module includes at least one optical functional element producing optical loss within the bandwidth $\Delta\lambda$ and at least a second rare-earth doped fiber segment, wherein the functional module is located at a midstage access point of the optical amplifier; and
   wherein the node is configured such that when the functional module is removed from the inline path such that the input fiber span remains optically coupled to the output fiber span, the network node achieves the gain slope $S_{opt}$ across the particular bandwidth $\Delta\lambda$ when operating at an operating average gain level G across the bandwidth $\Delta\lambda$ and without adjustment of optical loss of any element in the node.

2. The network node of claim 1 wherein the gain slope $S_{opt}$ is about equal to zero across the bandwidth $\Delta\lambda$ to thereby achieve gain flatness.

3. The network node of claim 1 further comprising a variable optical attenuator (VOA) located in the inline path.

4. The network node of claim 1 wherein the first and second rare-earth doped fiber segments are erbium doped fiber segments.

5. The network node of claim 1 wherein the functional module is unpumped and produces attenuation.

6. The network node of claim 1 wherein the functional module is pumped and produces amplification.

* * * * *